(12) United States Patent
Murphy

(10) Patent No.: US 10,667,651 B2
(45) Date of Patent: Jun. 2, 2020

(54) APPARATUS AND METHOD FOR SHAPING A FOOD PRODUCT

(71) Applicant: Paul Murphy, Ballina (IE)

(72) Inventor: Paul Murphy, Ballina (IE)

( * ) Notice: Subject to any disclaimer, the term of this patent is extended or adjusted under 35 U.S.C. 154(b) by 323 days.

(21) Appl. No.: 15/032,399

(22) PCT Filed: Nov. 3, 2014

(86) PCT No.: PCT/EP2014/073594
§ 371 (c)(1),
(2) Date: Apr. 27, 2016

(87) PCT Pub. No.: WO2015/063304
PCT Pub. Date: May 7, 2015

(65) Prior Publication Data
US 2016/0255874 A1 Sep. 8, 2016

(30) Foreign Application Priority Data

Nov. 1, 2013 (IE) .................................. S2013/0334

(51) Int. Cl.
*A23G 3/02* (2006.01)
*A47J 43/20* (2006.01)
(Continued)

(52) U.S. Cl.
CPC ................. *A47J 43/20* (2013.01); *A21B 3/13* (2013.01); *A22C 7/0015* (2013.01); *A22C 7/0046* (2013.01); *A23P 30/10* (2016.08)

(58) Field of Classification Search
CPC ..... A23P 30/10; A22C 7/0046; A22C 7/0015; A47J 43/20; A21B 3/13
(Continued)

(56) References Cited

U.S. PATENT DOCUMENTS 2,232,633 A * 2/1941 Richardson ............ A21C 9/068
425/293
2,957,199 A * 10/1960 Bentley ................ A22C 7/0015
425/278
(Continued)

FOREIGN PATENT DOCUMENTS

DE 2830693 1/1980
FR 2688385 9/1993
(Continued)

*Primary Examiner* — Seyed Masoud Malekzadeh
(74) *Attorney, Agent, or Firm* — Jeffrey Joyce, Esq.

(57) ABSTRACT

The present invention relates to an apparatus (100) and method for shaping a food product comprising: an open container (102) for receiving food mix, the container (102) being divided into a plurality of open container chambers (104) in which each container chamber (104) has a side wall forming an opening for receiving the food mix; a mould insert (114) comprising a plurality of mould chambers (116), each mould chamber (116) having a side wall which cooperates with the side wall of one of the container chambers (104) to define a plurality of interior mould cavities (120) when the container (102) and the mould insert (114) are joined. The side wall of each mould chamber (116) forms a cutting edge operable during compression to simultaneously and slidingly engage against the side wall of each container chamber (104) to cut into and fully separate food mix contained within the interior mould cavity (120) from any excess food mix remaining outside the interior mould cavity (120) to thereby form and shape a food product within each interior mould cavity (120).

14 Claims, 35 Drawing Sheets

(51) Int. Cl.
*A22C 7/00* (2006.01)
*A21B 3/13* (2006.01)
*A23P 30/10* (2016.01)

(58) Field of Classification Search
USPC ................................ 425/292, 293, 298, 300
See application file for complete search history.

(56) References Cited

U.S. PATENT DOCUMENTS

| | | | | |
|---|---|---|---|---|
| 3,753,398 | A * | 8/1973 | Dohm, Jr. | A22C 7/0023 |
| | | | | 100/218 |
| 4,362,497 | A * | 12/1982 | Lifshitz | A21C 11/106 |
| | | | | 249/119 |
| 6,761,108 | B1 * | 7/2004 | Dreano | A22C 7/0046 |
| | | | | 99/349 |
| 2003/0024400 | A1 * | 2/2003 | Dreano | A22C 7/0053 |
| | | | | 99/426 |
| 2006/0266915 | A1 * | 11/2006 | Parker | A23G 1/205 |
| | | | | 249/66.1 |
| 2008/0175968 | A1 * | 7/2008 | Bloom | A22C 7/0046 |
| | | | | 426/512 |
| 2009/0145306 | A1 | 6/2009 | Bearson et al. | |

FOREIGN PATENT DOCUMENTS

| | | |
|---|---|---|
| WO | 87/03462 A1 | 6/1987 |
| WO | 01/10222 A1 | 2/2001 |

\* cited by examiner

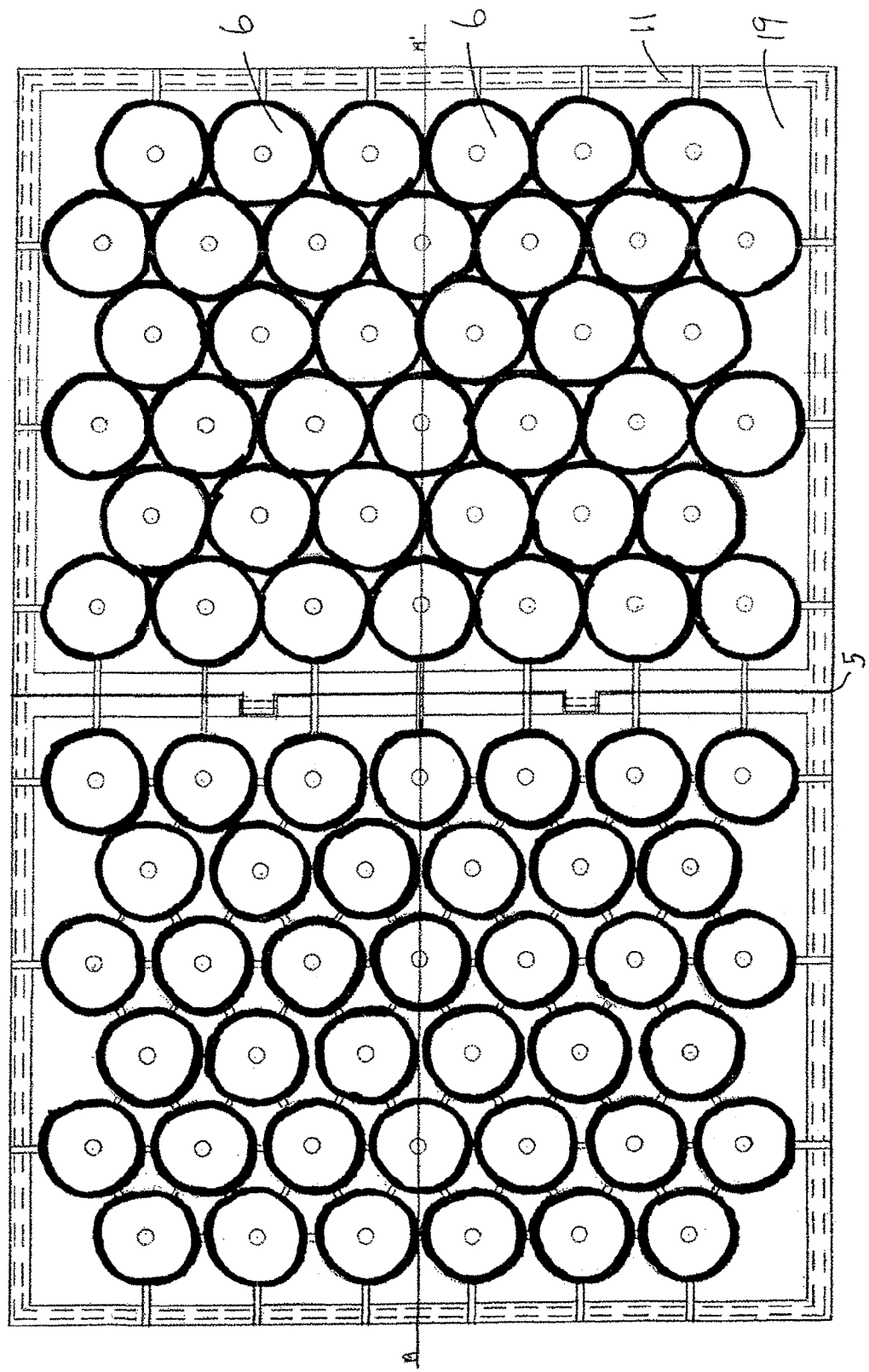

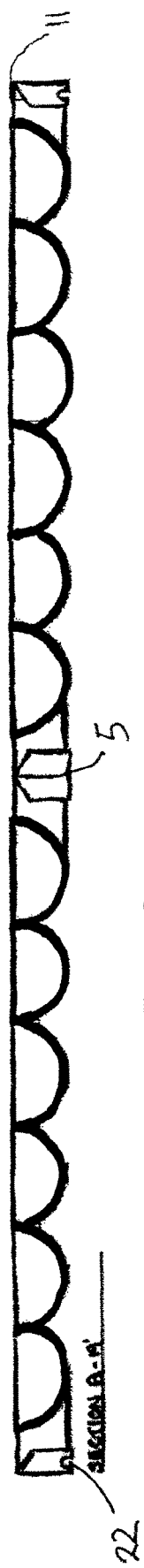

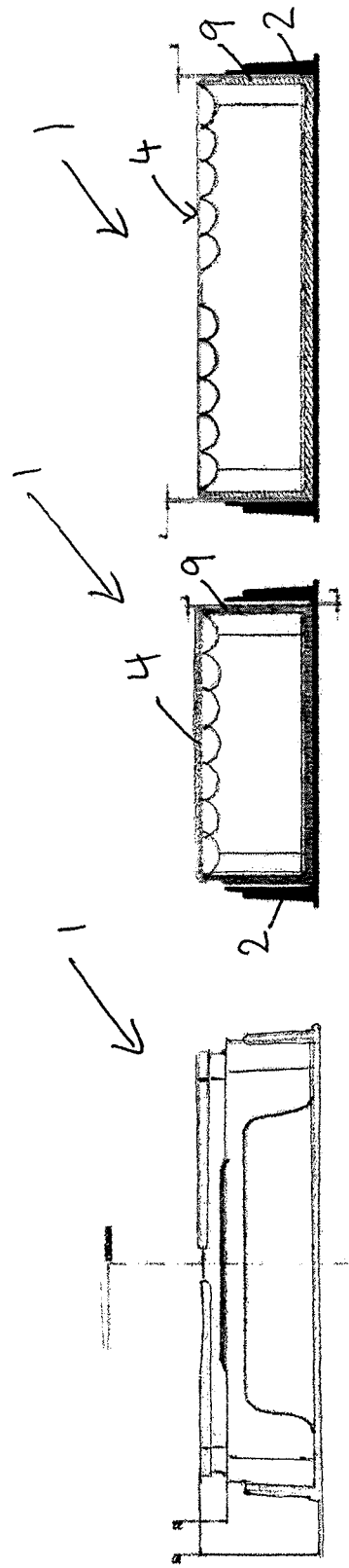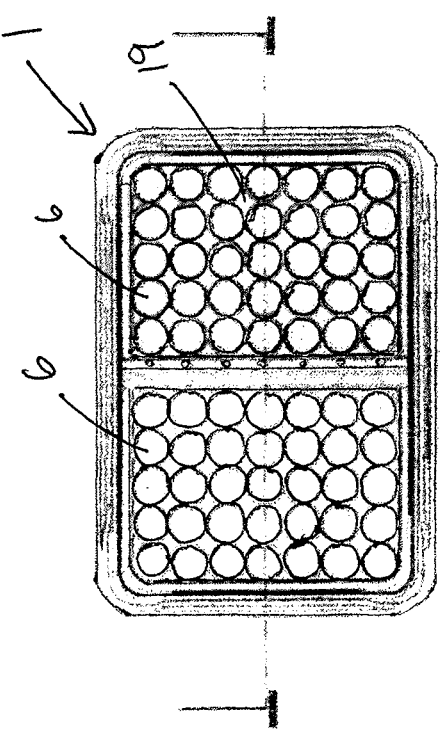

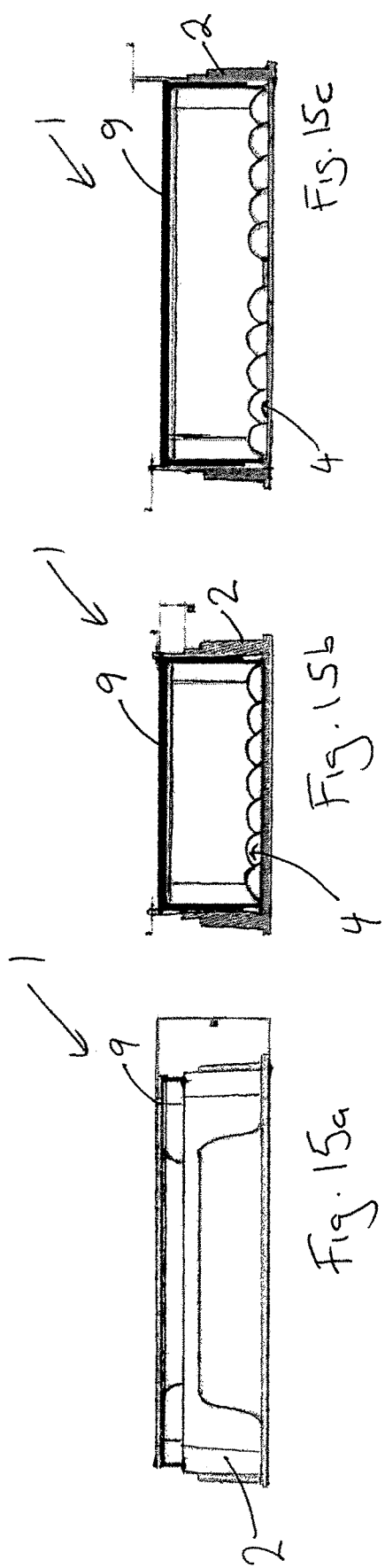
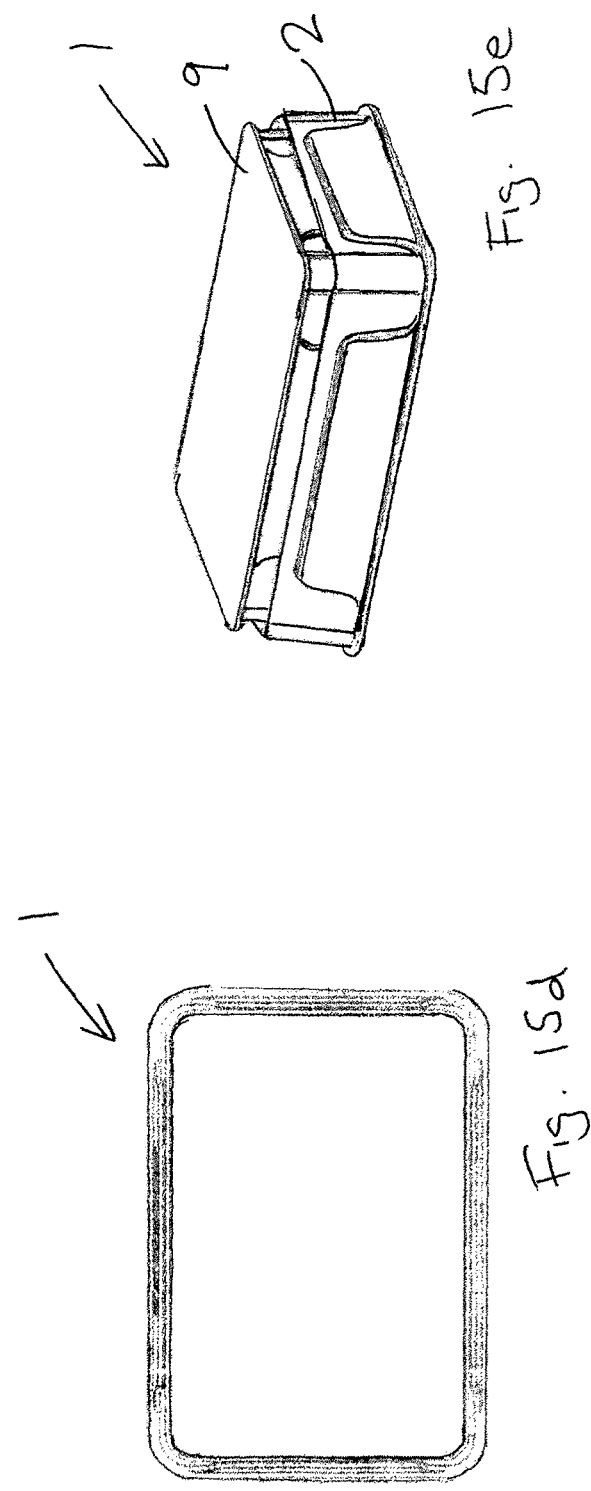
Fig. 15a
Fig. 15b
Fig. 15c
Fig. 15d
Fig. 15e

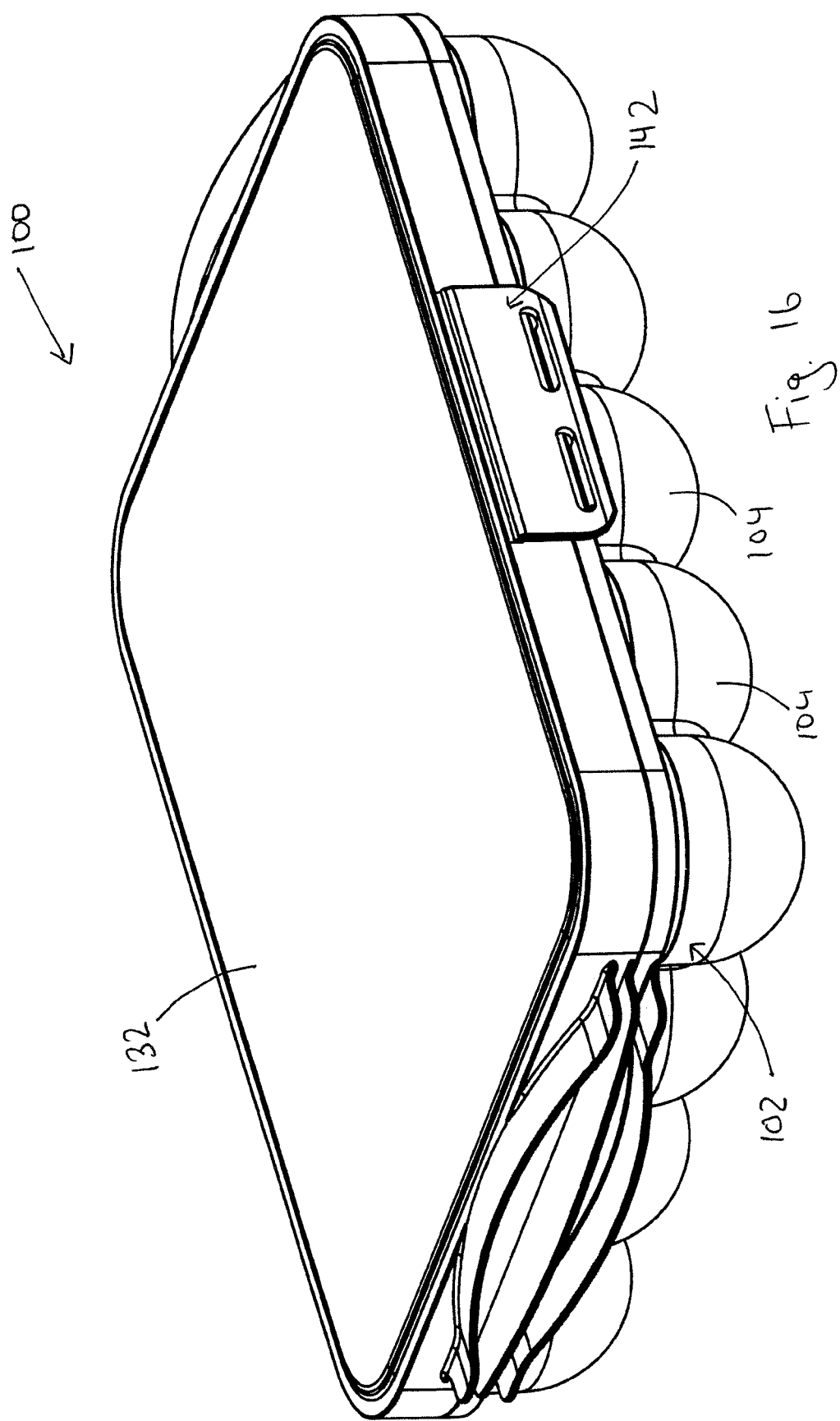

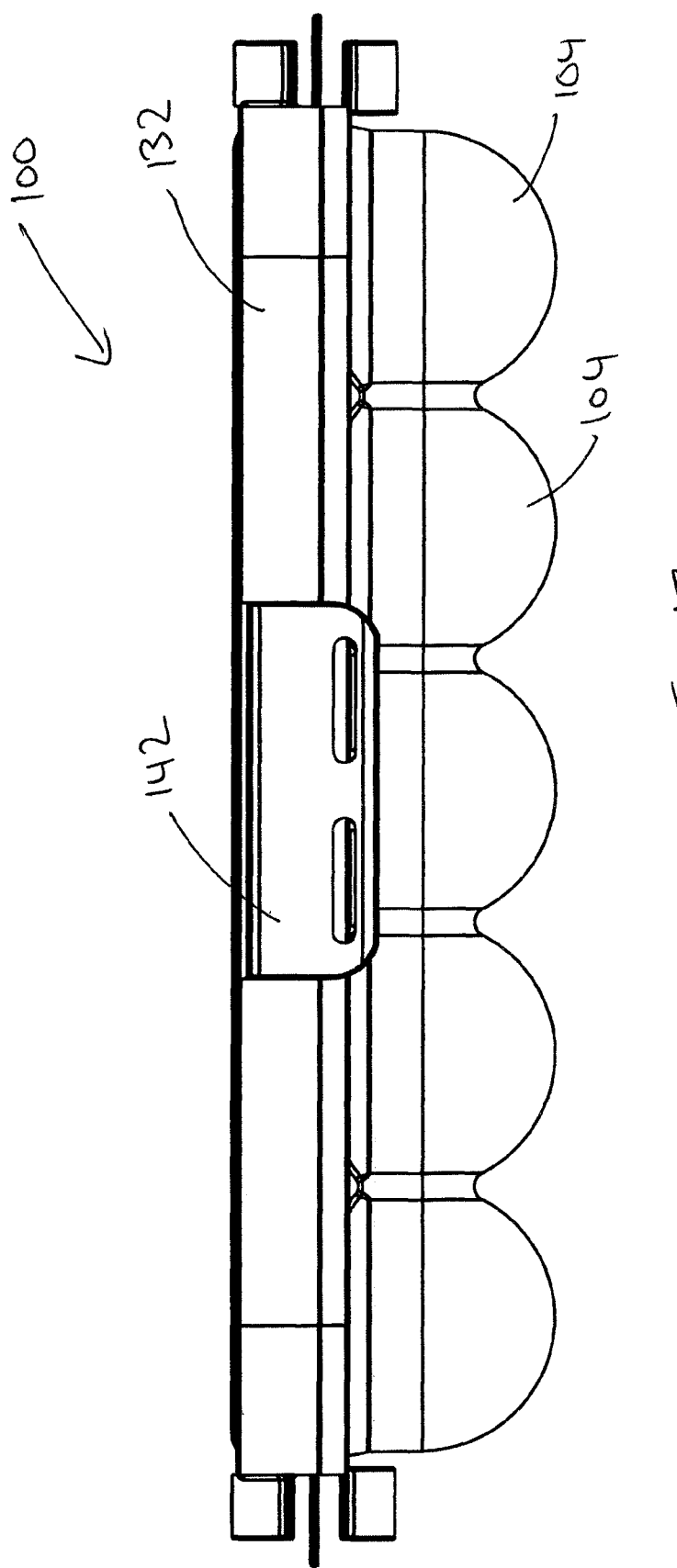

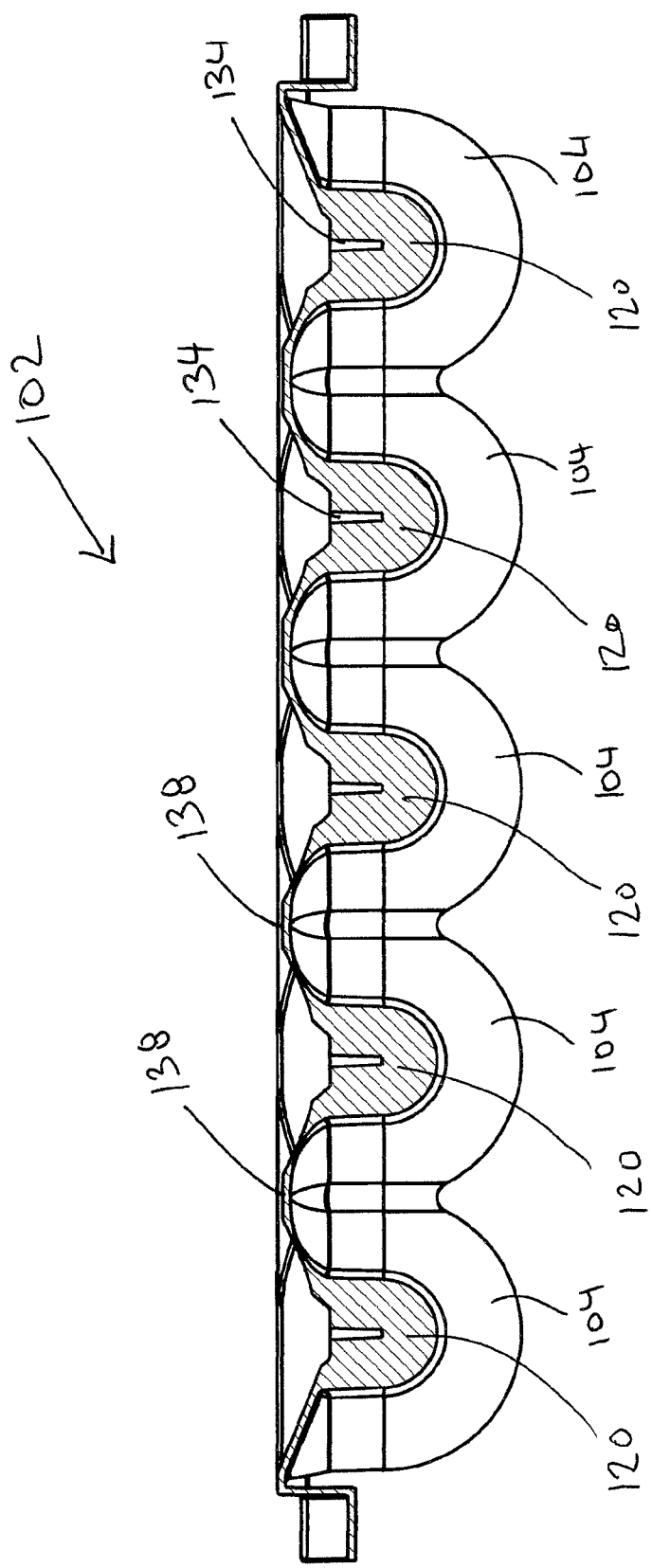

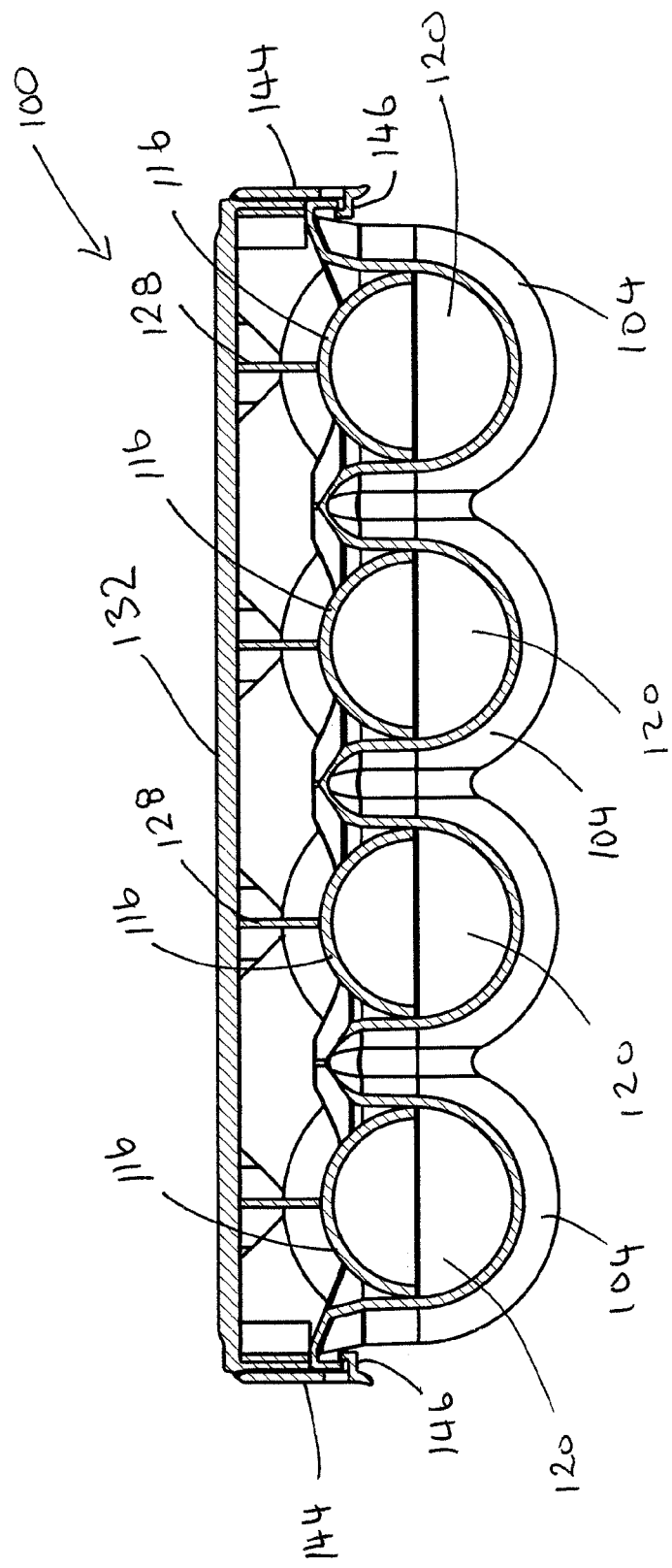

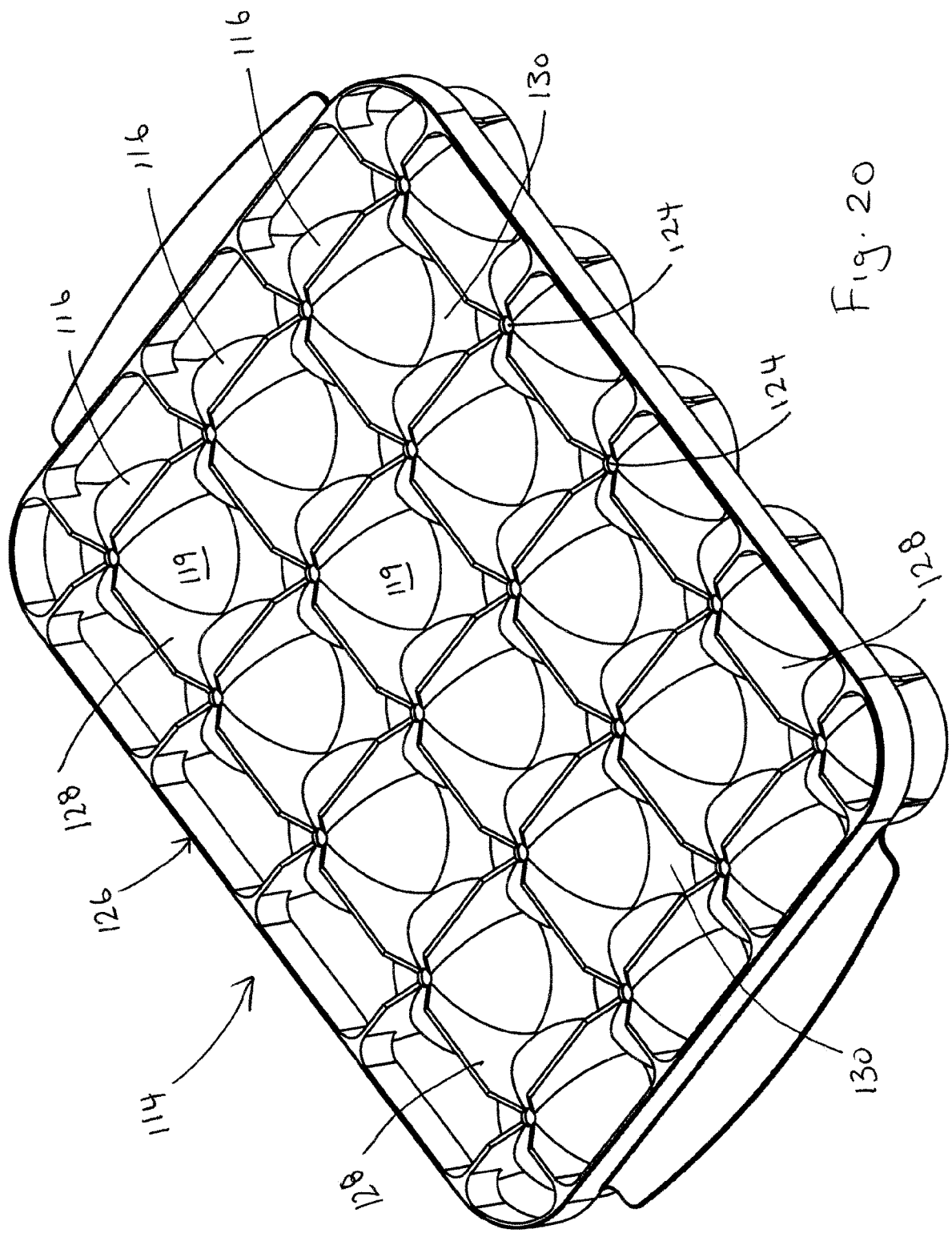

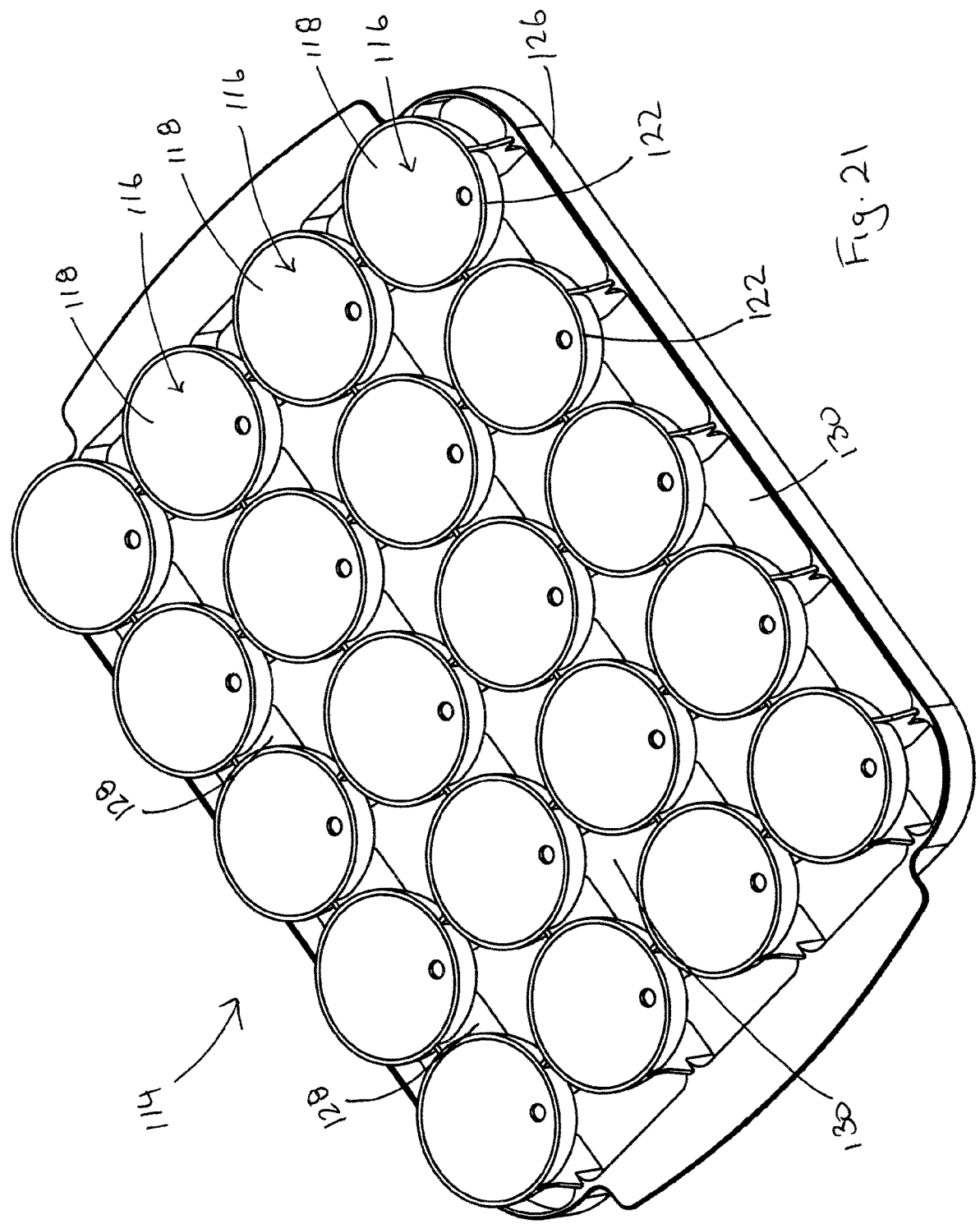

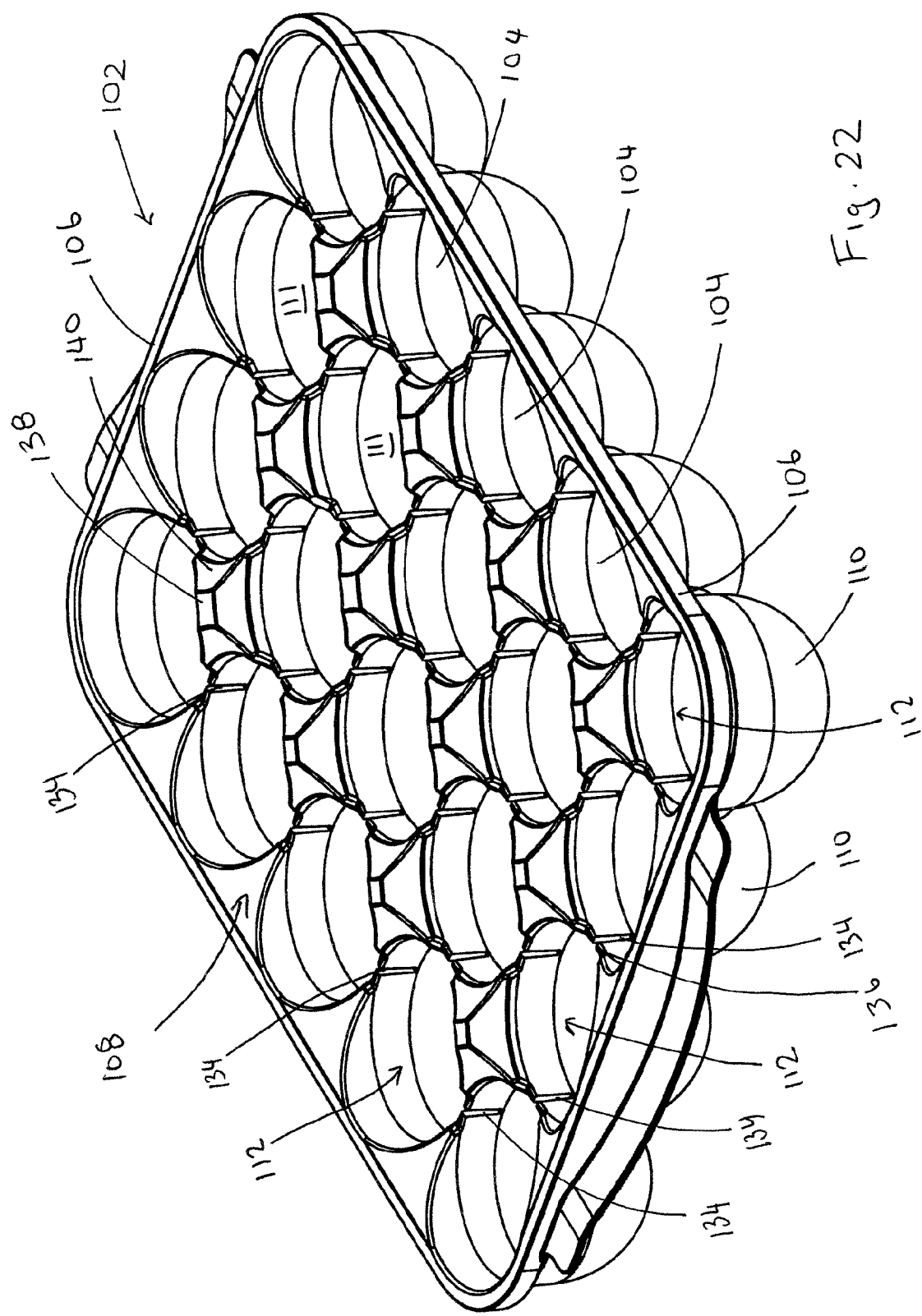

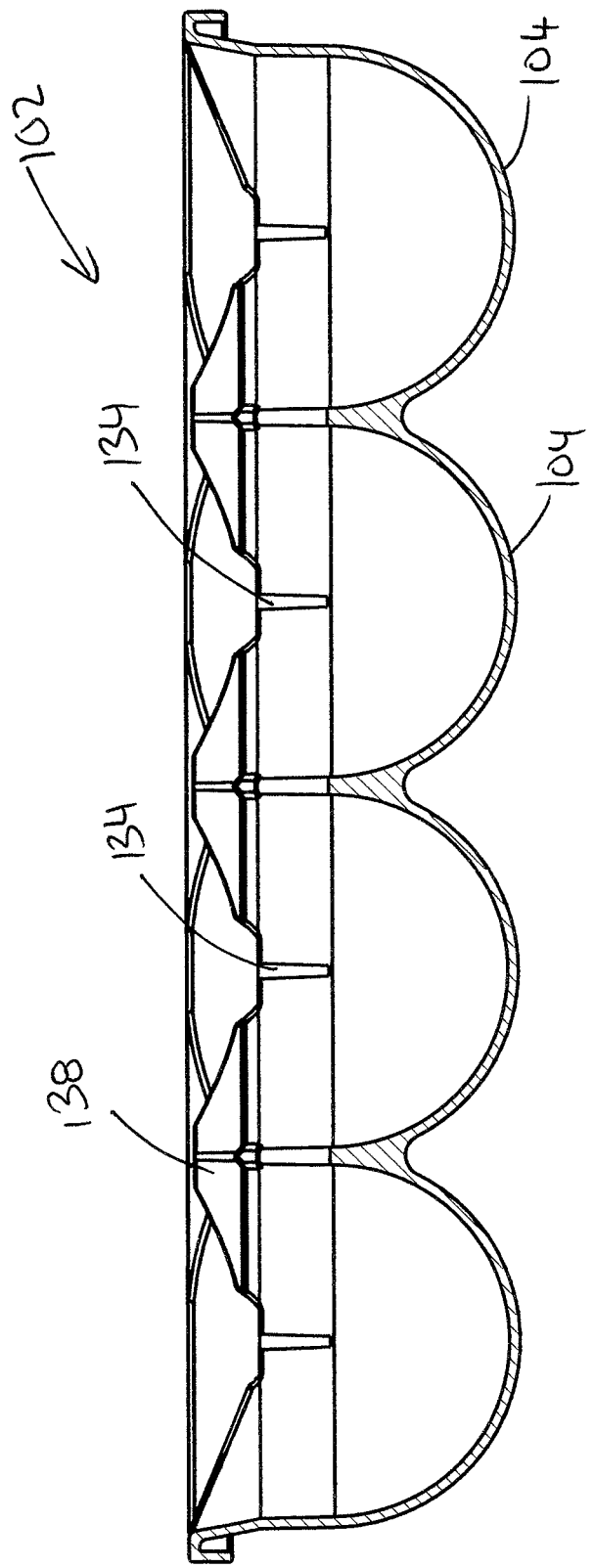

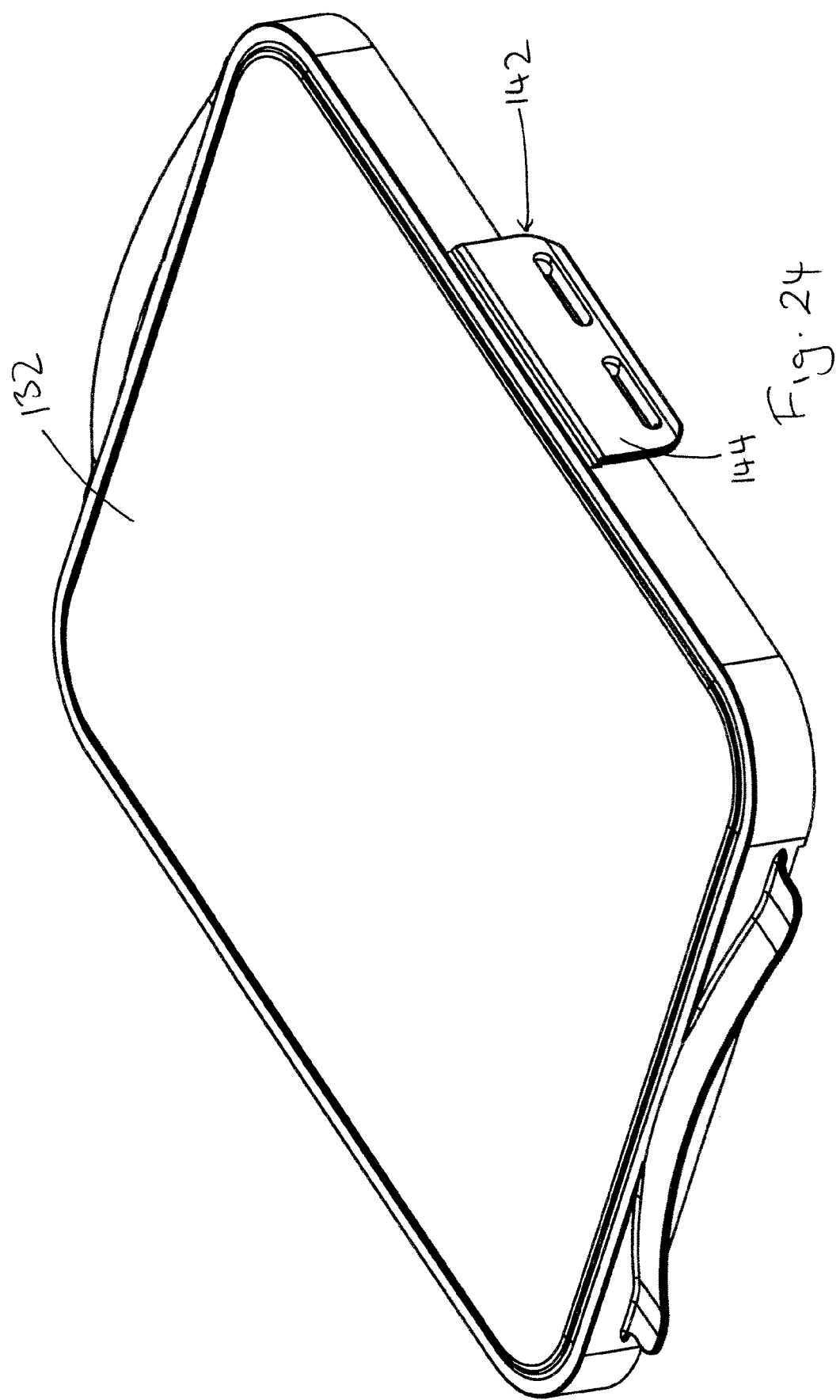

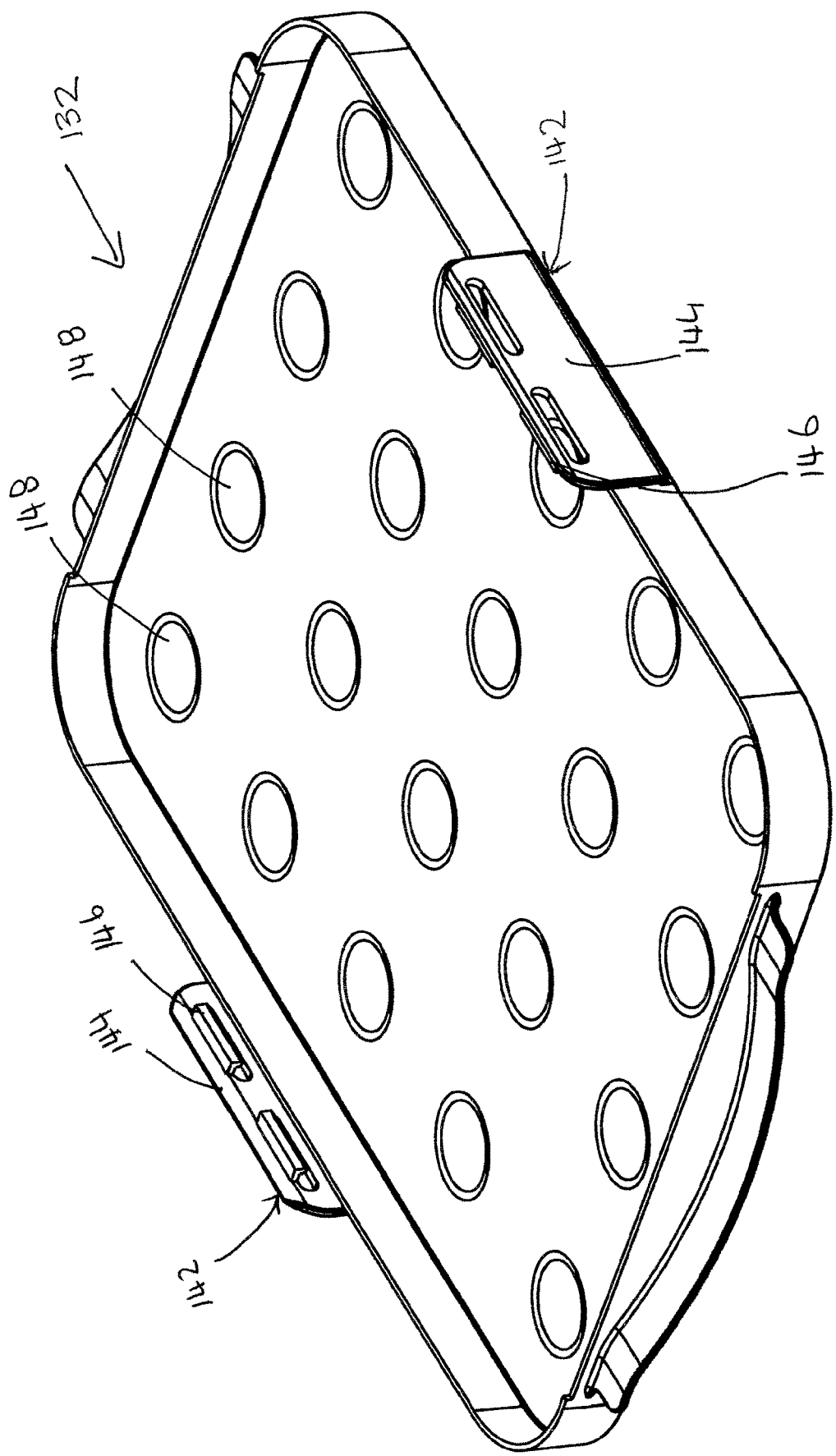

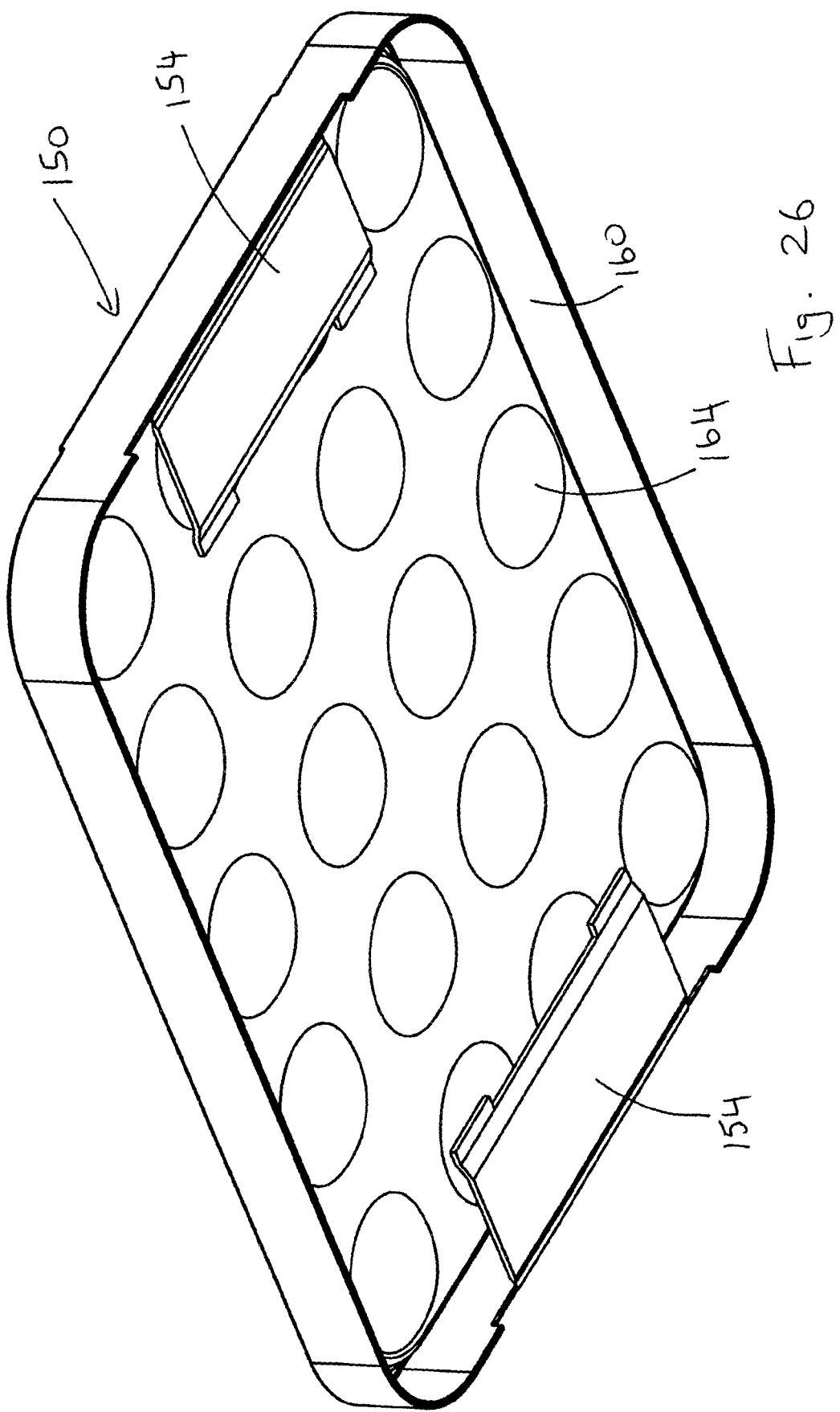

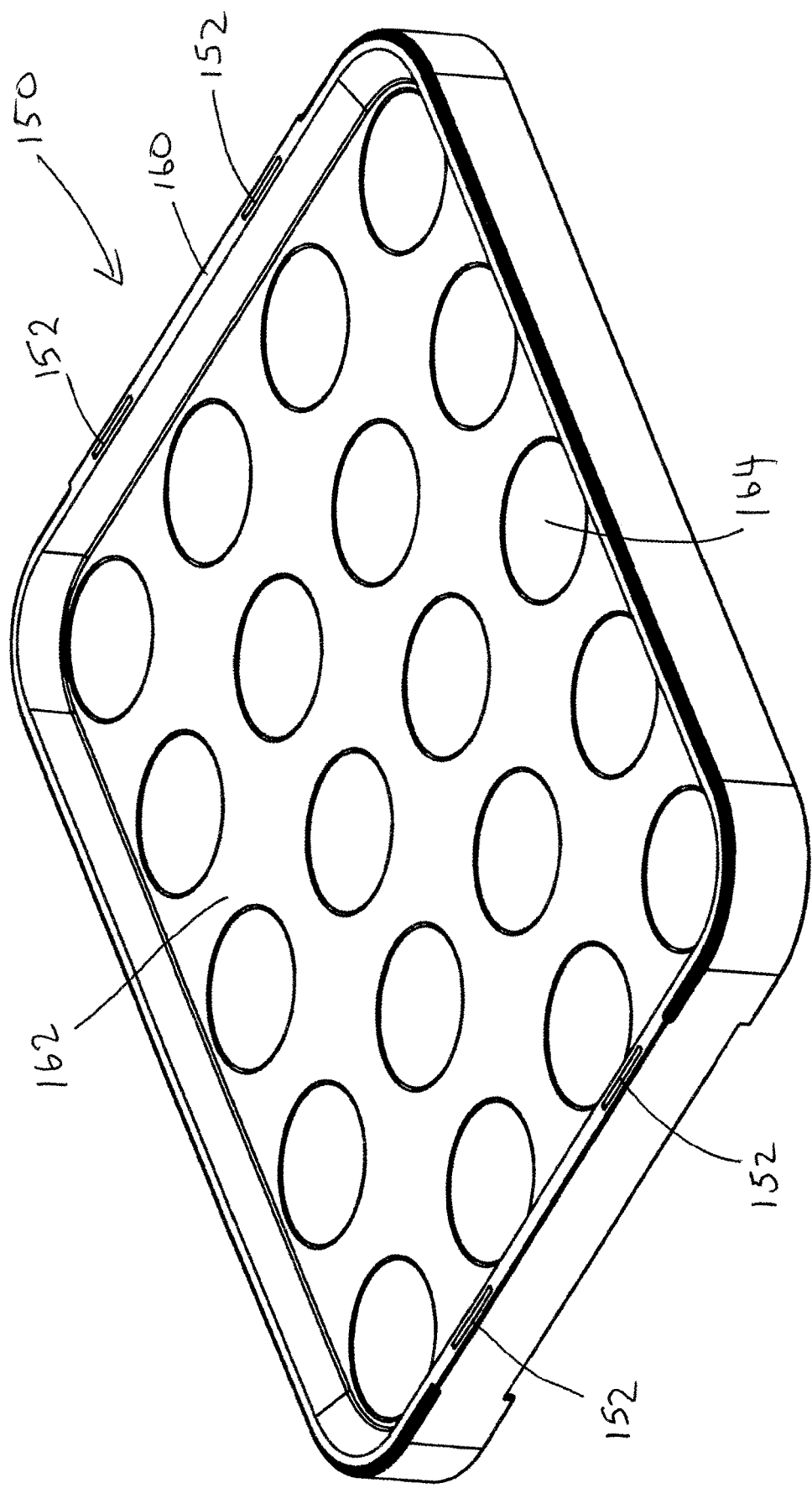

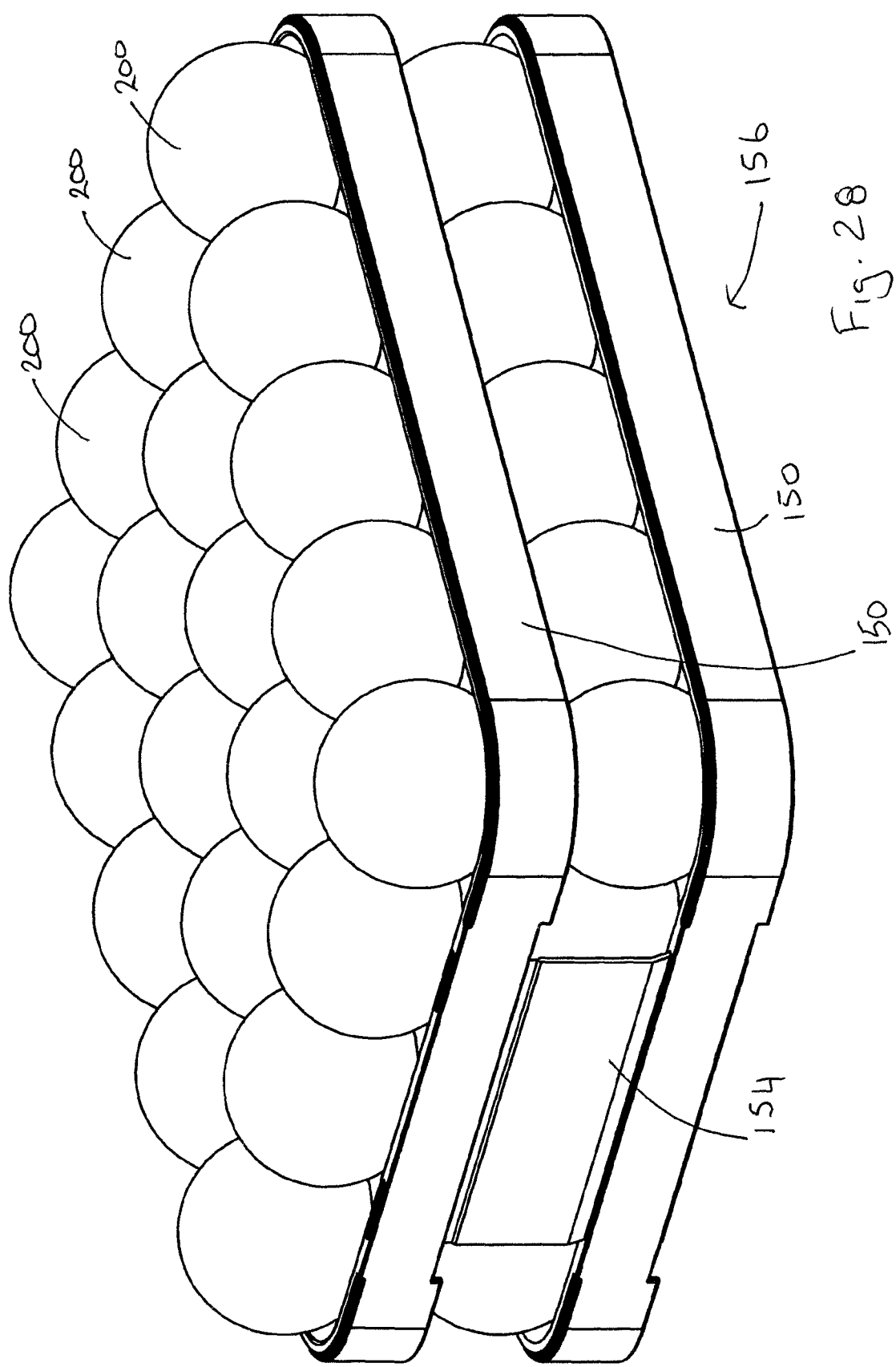

APPARATUS AND METHOD FOR SHAPING A FOOD PRODUCT

The present invention relates to an apparatus and method for shaping a food product.

Baking trays provide a mould in which certain food products, such as bread, cakes, muffins and the like, are shaped and cooked. Other moulds are used for shaping settable products, such a jellies, pates and the like. Moulds are also known for shaping and cutting food products into specific portion sizes.

However, these known moulds are unsuitable for use in fully shaping a food product around its entire outer surface so that the food product has a predetermined shape and size.

It is a therefore an object of the present invention to provide an apparatus and method for shaping a food product which goes at least some way toward overcoming the above problem and/or which will provide the public and/or industry with a useful alternative.

Further aspects of the present invention will become apparent form the ensuing description which is given by way of example only.

According to the invention there is provided an apparatus for shaping a food product comprising:
  an open container for receiving food mix, the container divided into a plurality of open container chambers in which each container chamber has a side wall forming an opening for receiving the food mix;
  a mould insert comprising a plurality of mould chambers, each mould chamber having a side wall which cooperates with the side wall of one of the container chambers to define a plurality of interior mould cavities when the container and the mould insert are joined;
  characterised in that, the side wall of each mould chamber is operable to be pushed into a respective container chamber to compress the food mix therein, and wherein the side wall of each mould chamber forms a cutting edge operable during compression to simultaneously and slidingly engage against the side wall of each container chamber to cut into and fully separate food mix contained within the interior mould cavity from any excess food mix remaining outside the interior mould cavity when the container and mould insert are joined together to thereby form and shape a food product within each interior mould cavity.

The present invention provides an apparatus operable to shape and form a food product, such as a meatball from minced meat.

The apparatus enables a user to shape and form multiple food products at the one time that could not normally be achieved due to the various physical complexities of certain foods, and to do so within a neat and confined working space. This is achieved with the use of an apparatus which employs a container and mould insert, each having multiple chambers which when pushed together form interior mould cavities by employing a combination of separation, cutting and compression actions which combine to form the food product.

The separation action is necessary since the cutting edge required to individually portion a quantity of food mix within the interior mould cavity in a single action may not be sufficient and may otherwise be unacceptable due to health and safety concerns. This combined cutting and separation action during compression also allows the food mix to be separated into a single complete portion within each interior mould cavity prior to being fully compressed into the desired shape and form.

Preferably, each container chamber and mould chamber cooperate when joined to form a substantially ball- or spherically shaped interior mould cavity.

Preferably, the cutting edge of each mould chamber is formed by a free end of the side wall of the mould chamber and has a perimeter less than the perimeter of the opening to each container chamber.

Preferably, each mould chamber comprises a venting aperture.

Preferably, the mould chambers are connected together by a framework comprising an arrangement of cross members.

Preferably, openings are provided between the mould chambers in the framework.

Preferably, upstanding columns are interposed between adjacent container chambers of the container.

Preferably, the columns extend a pre-determined vertical distance above openings of the container chambers.

Preferably, the columns comprise a tapered apex.

Preferably, each container chamber comprises at least one notch formed in a side wall thereof.

Preferably, each container chamber comprises a plurality of receivers formed in the side wall thereof, whereby the cross members of the mould insert are adapted to engage into the receivers when the container and mould insert are joined together.

Preferably, each receiver is formed as a notch which extends orthogonally down from the free edge of the side wall a pre-determined distance into the container chamber.

Preferably, the apparatus further comprises a lid connectable to one or both of the mould insert and the container.

Preferably, the apparatus further comprises locking means to releasably lock the lid to one or both of the mould insert and the container.

Preferably, the locking mechanism comprises a pivotable latch having a free end mounting a hook.

Preferably, the lid mounts the pivotable latch on a side wall thereof such that when the latch is pivoted the hook is operable to connect under a rim of the container to secure the lid to the container.

Preferably, the lid comprises a base and a side wall, and depressions are provided on a surface of the base wall.

Preferably, the apparatus further comprises at least one storage tray comprising a plurality receiving apertures, whereby the pivotable latch of the lid is operable to engage in a receiving aperture of the storage tray to provide with the storage tray a tiered storage device for the food product.

Preferably, the apparatus further comprises plurality of storage trays, each storage tray comprising a plurality receiving apertures and pivotable supports, whereby the pivotable supports of each storage tray are operable to engage in a receiving aperture of a further storage tray to provide a tiered storage device for the food product.

Preferably, each storage tray comprises a plurality of depressions.

Preferably, the storage trays are stored in a nested configuration within an area defined between the side wall and base wall of the lid.

According to a further aspect of the invention, there is provided a method of operating an apparatus for shaping a food product to form a food product, the method comprising the steps of:
  receiving food mix into the container;
  aligning the container with the mould insert such that the openings of the mould chambers and the openings of the container chambers are facing;

pressing the container and the mould insert together to from a plurality of interior mould cavities such that the food mix in the cavities is compressed to form a food product.

Preferably, the method comprises a step of: operating the lid to press the food mix into the container.

Preferably, the method comprises a step of: connecting the lid so that it extends across the mould insert.

Preferably, the method comprises a step of: inverting the apparatus so that excess food mix that flows through the venting aperture and the openings between the mould chambers of the framework falls into the lid.

Preferably, the method comprises a step of: removing the lid and the mould insert from the container exposing the food product formed in the container chambers and then placing the lid across the opening of the container and inverting the container so that the formed food product falls into the depressions of the lid.

In a further aspect of the invention, there is provided an apparatus for shaping a food product comprising:
a first container having an opening for receiving food mix;
a mould insert having and an arrangement of receiving recesses;
a second container having an opening for receiving the mould insert;
wherein, the containers are adapted so that when pressed together via their openings the food mix in the first container is pressed into the recesses in the mould insert.

Preferably, the mould insert is foldable about a pivot and, and whereby folding sides of the mould insert together causes food mix in recesses on opposing sides of the mould insert to combine and form a shaped food product.

Preferably, the mould insert is adapted such that unfolding the sides causes the food product formed between a pair of recesses to be released.

Preferably, each container comprises a base wall, a side wall on the base wall and the opening is opposite the base wall.

Preferably, edges of the mould insert rest on the side wall and above the base wall of the second container.

Preferably, the recesses in the mould are shaped as hemispheres. This provides that when the sides of the mould are folded together the food product formed is substantially ball or spherically shaped.

Preferably, the recesses on one side of the mould insert are slightly larger than the recesses on the other side of the mould insert. This enables a good mating connection or complimentary fit when the recesses on the opposing sides of the mould insert are pressed together.

Alternatively, the recesses in the mould are shaped as stars, moons, fish or any other shape as required or desired. The recesses may also be a different shape in the same mould.

Preferably, the first container has a perimeter that is greater than the second container.

Preferably, a through hole is provided in each recess of the mould and optionally, in between the recesses of the mould. This enables excess food mix to be pushed out of the recess when the sides of the mould are pressed together and promotes the ease of movement during pressing of the containers by allowing any trapped air to flow there through. Other arrangements of ventilation slits or openings are also envisaged to facilitate the venting or release of air between the containers when the containers are pressed together.

Preferably, a scale is provided on the first container to indicate a quantity of food mix received in the first container.

According to a further aspect of the invention, there is provided a method of shaping a food product comprising the steps of:
receiving food mix through an opening in a first container;
positioning a mould insert foldable about a pivot and having an arrangement of receiving recesses on an opening of a second container;
pressing the containers together via their openings such that the food mix in the first container is pressed into the recesses in the mould insert,
rotating the joined containers,
separating the containers,
removing the mould insert from the second container, and
folding the sides of the mould tray together to cause food mix in recesses on opposing sides of the mould insert to combine and form a shaped food product.

It will be understood that the recesses of the mould insert holding food mix will be held against the base wall of the first container during rotation of the containers so that the food mix will be retained in the recesses when the containers are rotated.

Preferably, the method comprises the further step of: unfolding the sides of the mould insert to release the shaped food product.

DETAILED DESCRIPTION OF THE INVENTION

The invention will be more clearly understood from the following description of some embodiments thereof, given by way of example only, with reference to the accompanying drawings, in which:

FIGS. 13a and 13b show plan and side views of the mould insert shown in FIG. 10;

FIGS. 14a to 14e are side, sectional, plan and perspective views of the apparatus according to the invention, and FIGS. 15a to 15e are side, sectional, plan and perspective views of the apparatus according to the invention.

FIG. 16 is a perspective view of an apparatus for shaping a food product according to a further embodiment of the invention;

FIG. 17 is a side view of the apparatus shown in FIG. 16;

FIG. 18 is a sectional view of FIG. 17;

FIG. 19 is a further sectional side view of the apparatus shown in FIG. 16;

FIG. 20 is a perspective view from above of the mould insert according to the invention;

FIG. 21 is a perspective view from below of the mould insert shown in FIG. 20;

FIG. 22 is a perspective view from above of the container according to the invention;

FIG. 23 is a sectional view of a side of the container shown in FIG. 22;

FIG. 24 is a perspective view from above of the lid according to the invention;

FIG. 25 is a perspective view from below of the lid according to the invention;

FIG. 26 is a perspective view from below of a storage tray according to the invention;

FIG. 27 is a perspective view from above of the storage tray shown in FIG. 26;

FIGS. 28 and 29 are perspective and sectional views respectively showing a plurality of storage trays in a connected configuration for storing food product formed using the apparatus;

Figure 1:
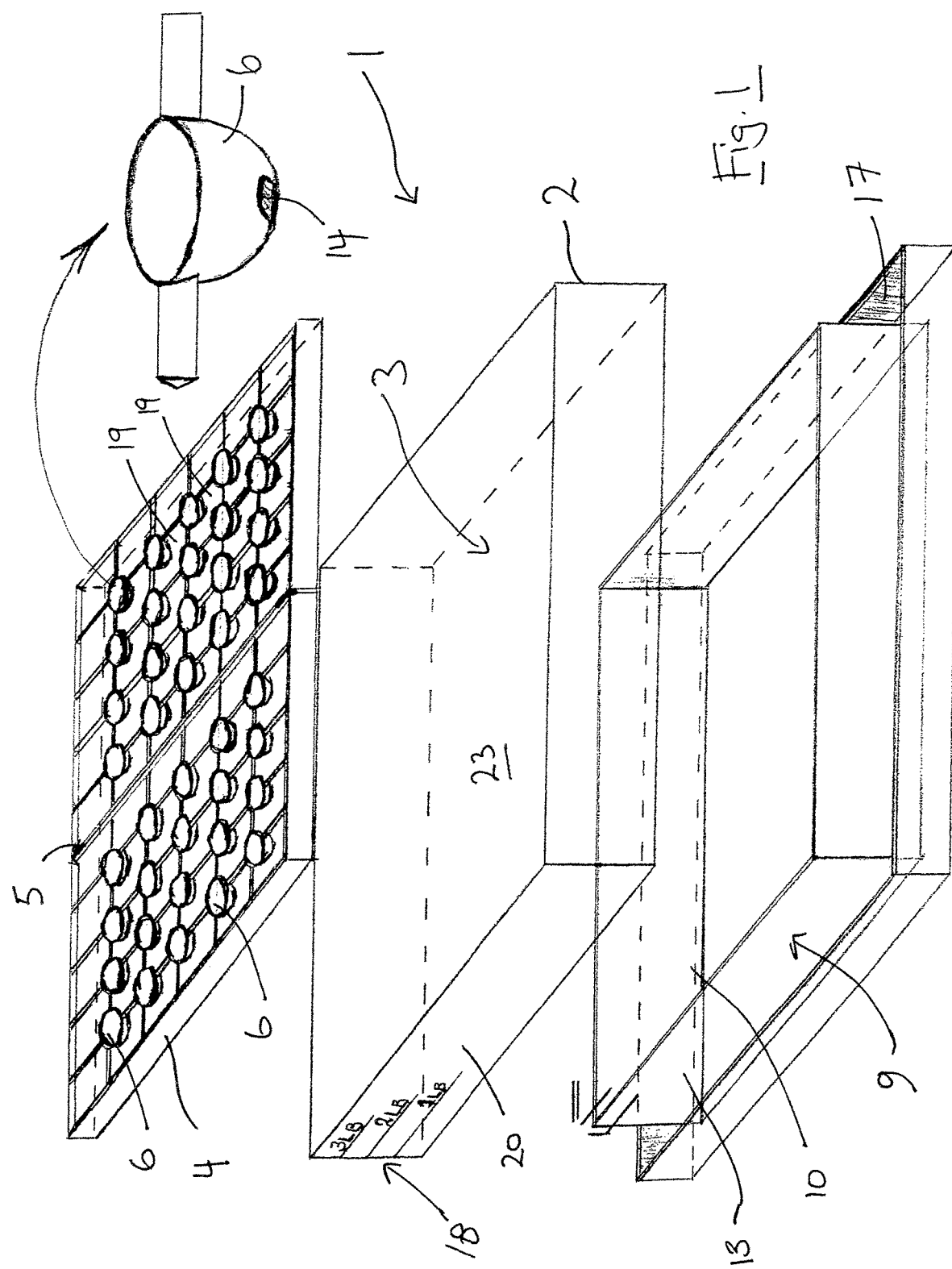
FIG. 1 is a sectional perspective view of an apparatus for shaping a food product according to one embodiment of the invention.

Referring to the drawings and initially to FIGS. 16 to 29, there is disclosed an apparatus, indicated generally by the reference numeral 100, for shaping a food product 200 from food mix. The food mix 50 may be of a type depending on the food product 200 required. For example, if burgers or meatballs are desired to be shaped or moulded to form the food product 200 then the food mix 50 will be typically be of a ground meat type food mix suitable for making burgers or meatballs. Conversely, if cakes, biscuits are other baked food products are to be shaped, then it will be appreciated that the food mix 50 will be of a type suitable for those products. Reference throughout the description to the use of the present invention use ground or mince meat to make meatballs should therefore in no way be seen as limiting.

The apparatus 100, which is shown in FIGS. 16 to 19 in a closed configuration for storage, comprises a container 102 having a plurality of open container chambers 104 and having a side wall 106 defining an opening, indicated generally by the reference numeral 108, through which food mix 50 is received into the container 102. Each container chamber 104 also includes a side wall 110 defining an opening 112 to each container chamber 104.

Also provided is a mould insert 114 comprising a plurality of mould chambers 116, each mould chamber 116 having a side wall 118 which cooperates with a container chamber 104 to define a plurality of interior mould cavities 120 when the container 102 and the mould insert 114 are joined together. As shown, when each container chamber 104 and mould chamber 116 cooperate when joined they form a substantially ball- or spherically shaped interior mould cavity 120, although it will be understood that the shape of the interior mould cavity may be configured as required or desired by changing the shape of the respective container and mould insert chambers, which are shown as hemispheres for illustrative purposes only. For example, if a cube shaped food product 200 is desired then the respective container and mould chambers would be shaped accordingly. The mould chambers 116 and container chambers 104 form two halves of the interior mould cavity 120 within which the food product 200 is formed by compression of the food mix 50.

The apparatus 100 further comprises a lid 132 connectable to one or both of the mould insert 114 and the container 102.

In use, the side wall 118 of each mould chamber 116 is thus operable to be pushed into a respective container chamber 104 to compress food mix 50 within the interior mould cavity 120 to form and shape a spherically shaped food product 200.

The side wall 118 of each mould chamber 116 further comprises a free cutting edge 122 operable during compression of the food mix 50 within the interior mould cavity 120 to simultaneously cut into and fully separate from food mix 50 contained within an interior mould cavity 120 any excess food mix 50 remaining outside the interior mould cavity 120 when the container 102 and mould insert 114 are joined together to thereby form and shape the food product 200 within the interior mould cavities 120.

The free cutting edge 122 of each mould chamber 116 has a perimeter less than the openings 112 to each container chamber 104 and the outer surface 119 of the side wall 118 of each mould chamber 116 has a snug sliding fit against the inner surface 111 of the side wall 110 of each container chamber 104 to thereby aid separation by drawing into the inner mould cavity 120 components of the food mix 50 which are not able to be cut, such a meat sinew, to ensure that food mix 50 within the inner mould cavity 120 is fully separated from food mix 50 remaining outside the inner mould cavity 120.

Each mould chamber 116 comprises a venting aperture 124 in a the side wall 118 thereof to provide a passage for air in the food mix 50 and/or air and excess food mix 50 in the interior mould cavity to flow out of the apparatus 1 during pressing of the mould insert 114 into the container 102.

The mould chambers 116 are connected together by a framework 126 comprising an arrangement of cross members 128 and openings or gaps 130 are provided between the mould chambers 116 in the framework 126, which gaps 130 provide a passage for excess food mix 50 which has not been contained with an interior mould cavity 120 to pass from the container 102 and optionally into the lid 132 during pressing of the mould insert 114 into the container 102.

Each container chamber 104 further comprises a plurality of receivers 134 formed in the side wall 118 thereof, whereby the cross members 128 of the mould insert 114 are adapted to slidingly engage into the receivers 134 when the container 102 and mould insert 114 are joined together. In the instance shown, each receiver 134 is formed as a notch which extends orthogonally from a top edge 136 of the side wall 106 a pre-determined distance into the container chamber 104 to regulate the depth into which the mould insert chamber 116 extends into the container chambers 104 during pressing to form a food product 200 of the desired size.

The container 102 also comprises upstanding columns 138 interposed between adjacent container chambers 104, whereby the columns 138 extend a pre-determined vertical distance above openings 112 of the container chambers 104 and have a tapered apex 140.

The apparatus 100 further comprises locking means, indicated generally by the reference numeral 142, to releasably lock the lid 132 to one or both of the mould insert 114 and the container 102. In the instance shown, the locking mechanism 142 comprises a pivotable latch 144 having a hook, whereby the lid 132 mounts the pivotable latch 144 on a side wall thereof such that when the latch 144 is pivoted the hook 146 is operable to connect under the side wall rim 106 of the container 102 to secure the lid 132 to the container 102.

The lid 132 comprises a base wall and a side wall upstanding on the base wall, and depressions or spherically shaped recesses 148 are provided on a surface of the base wall of the lid 132.

The apparatus 100 further comprises at least one storage tray 150 having a base wall 162 and a side wall 160 upstanding on the base wall 162. Shown formed in the base wall 162 are a plurality of depressions or spherically shaped recesses 164. A plurality receiving apertures 152 are formed in the side wall thereof, whereby the pivotable latch 144 of the lid 132 is operable to engage in a receiving aperture 152 of the storage tray 150 to provide a tiered storage device for the formed food product 200.

The apparatus may alternatively comprise a plurality of storage trays 150, each storage tray 150 comprising a plurality receiving apertures 152 and pivotable supports 154, whereby the pivotable supports 154 of each storage tray 150 are operable to engage in a receiving aperture 152 of a further storage tray 150 to provide a layered storage device 156 for the food product 200. The storage trays 150 are optionally stored in a nested configuration within an area defined between the base wall and upstanding side wall of the lid 132.

The method of operating an apparatus 100 for shaping a food product 200 to form a food product 200 will be described with reference to FIGS. 30 to 38.

Figure 30:
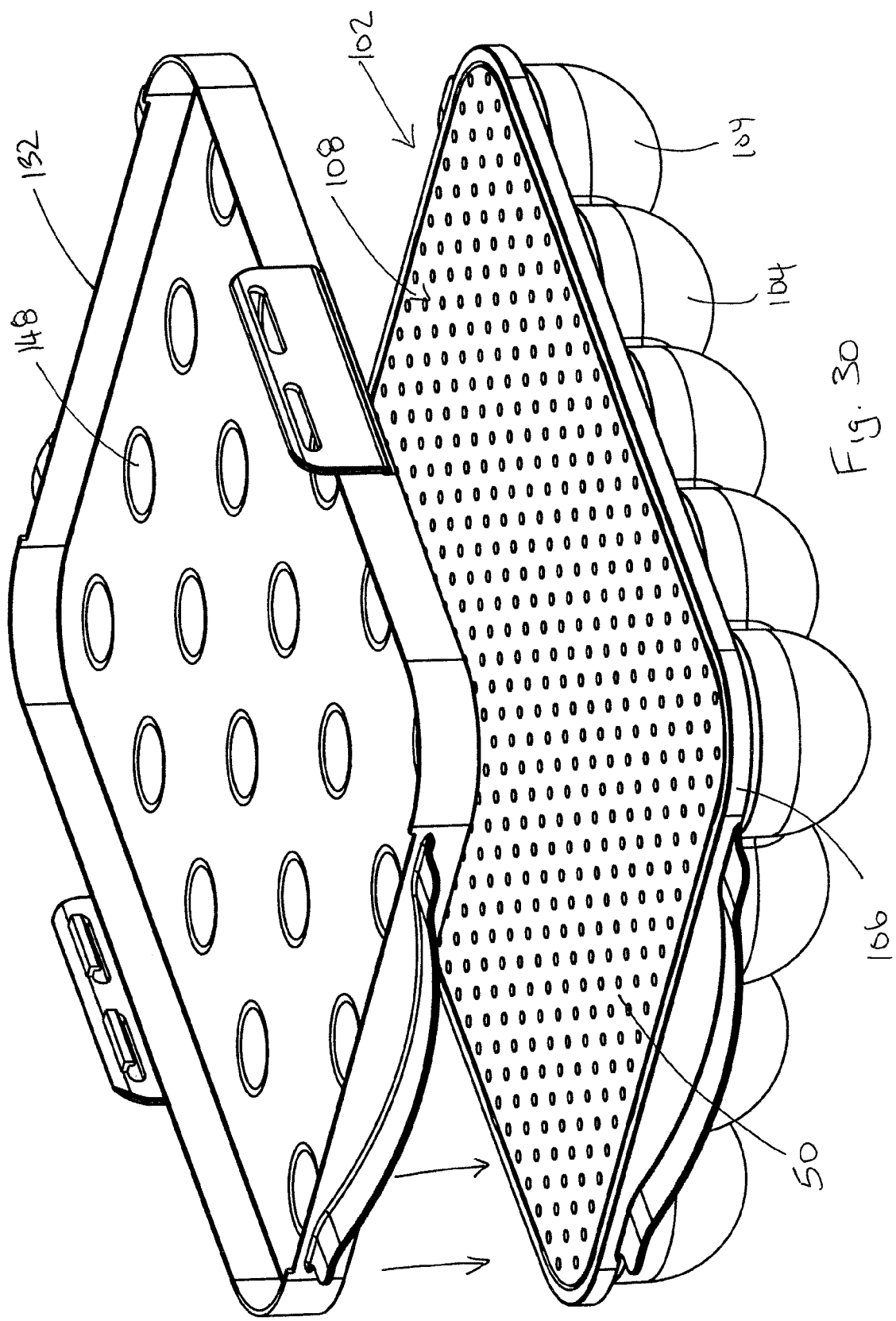
FIGS. 30 to 37 show steps in a method of shaping a food product using the apparatus of FIGS. 16 to 29.
Figure 31:
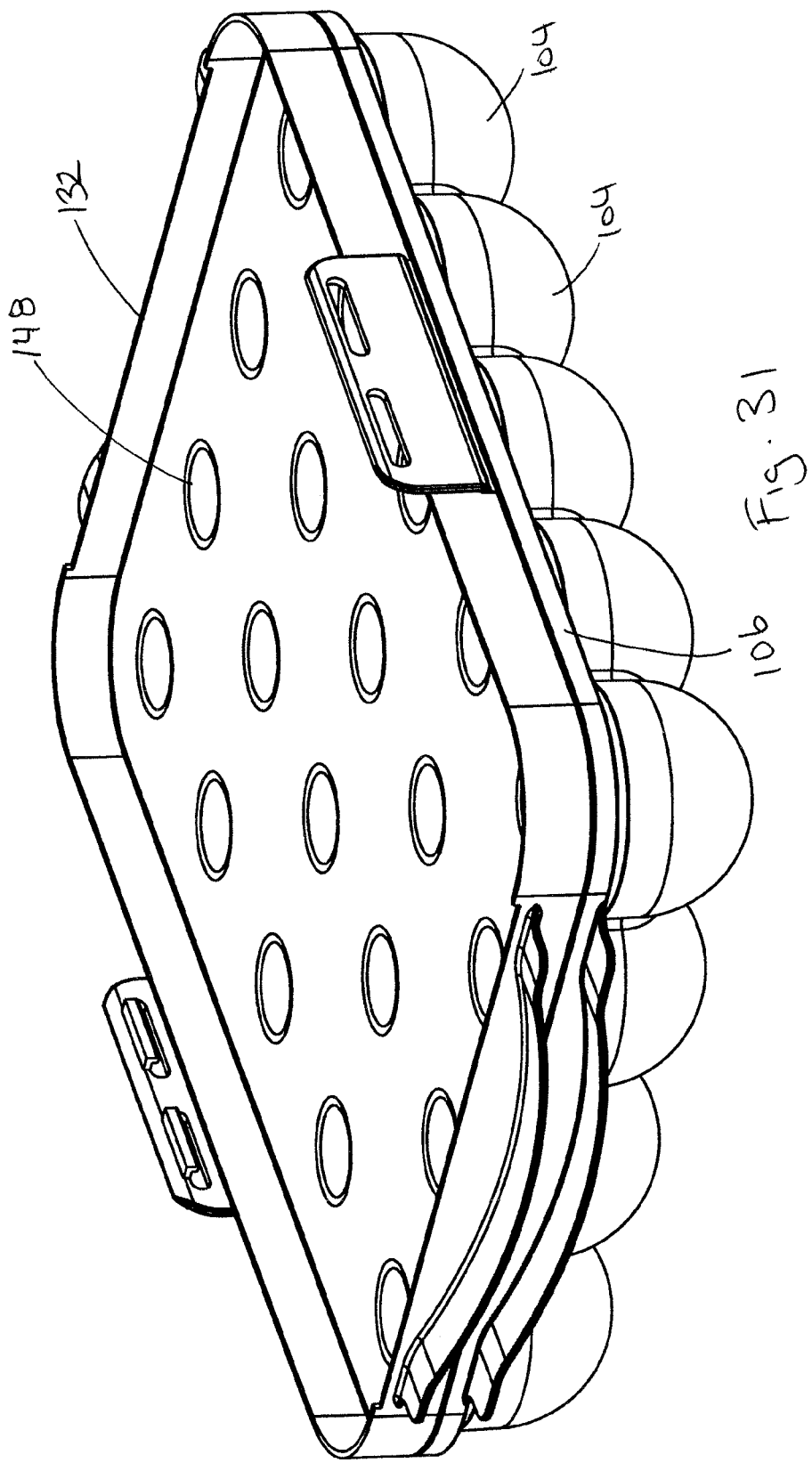
Figure 32:
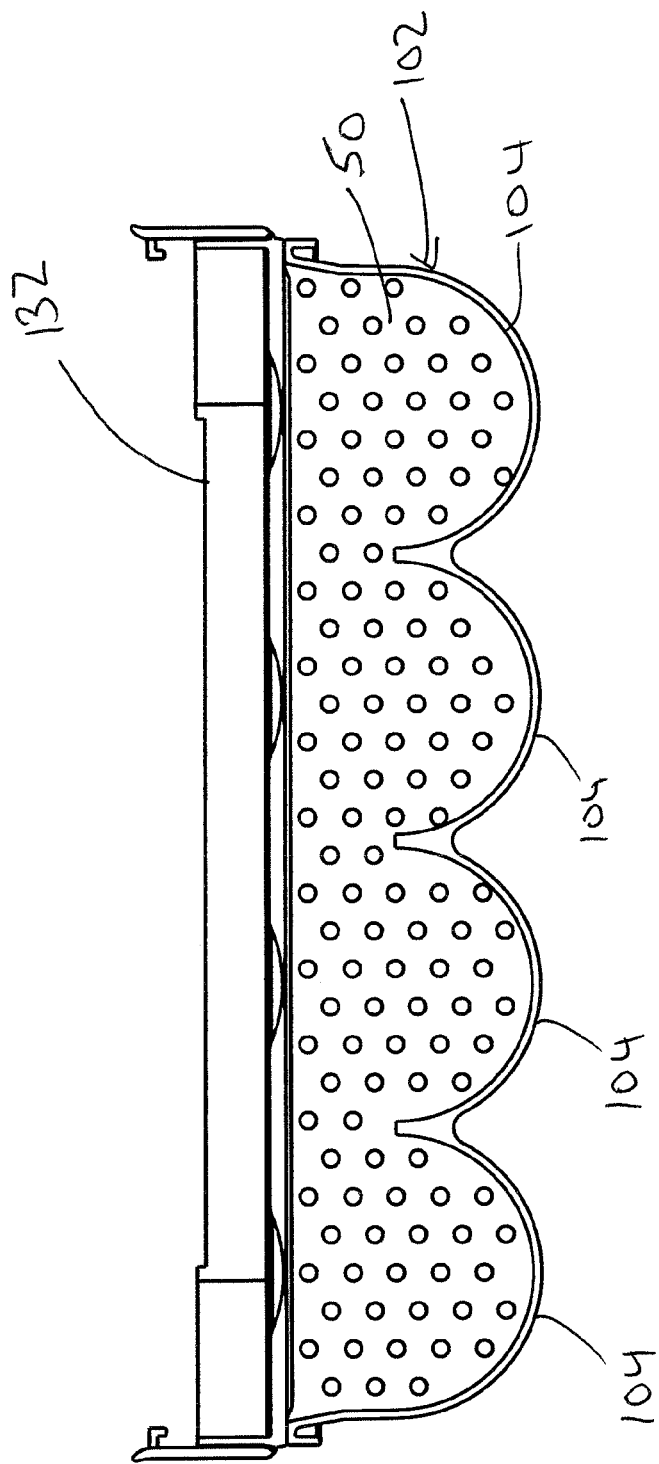
Figure 33:
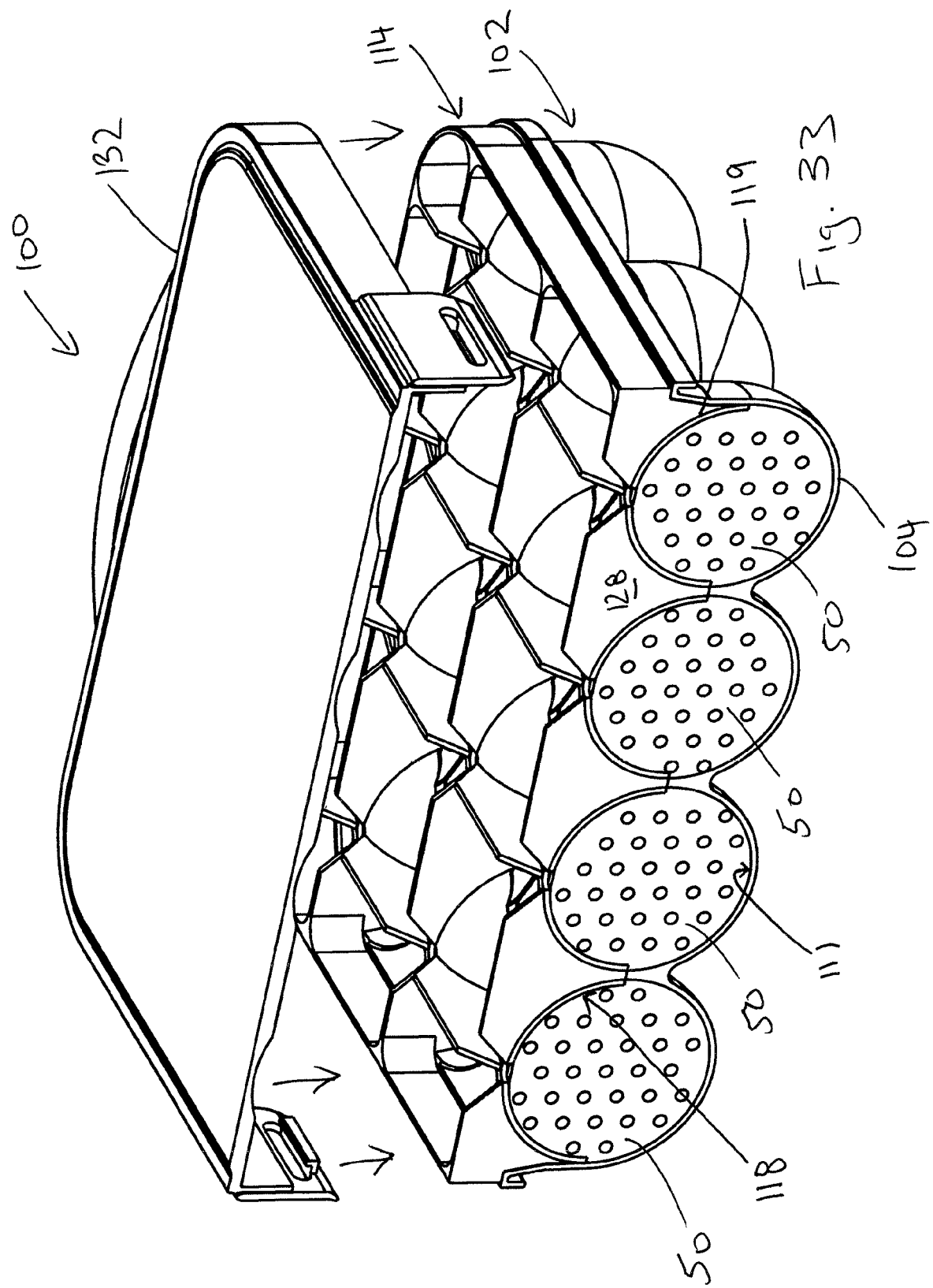

Initially, as shown in FIG. 30, the method comprises a step of a user placing or packing food mix 50 through the opening 108 of the container 102 so that the food mix 50 is packed into the container chambers 104. As shown in FIGS. 31 and 32, a user may operate by inverting the lid 132 to press the food mix 50 down into the container 102 so that it is levelled. As shown in FIG. 33, a user then aligns the container opening 108 with the framework 126 of the mould insert 114 such that the openings 130 of the mould chambers 116 and container chambers 104 are facing and the container 102 and the mould insert 114 are then pressed together to form a plurality of interior mould cavities 120 such that the food mix 50 in the cavities 120 is pressed to form a food product 200 of the desired shape.

Figure 34:
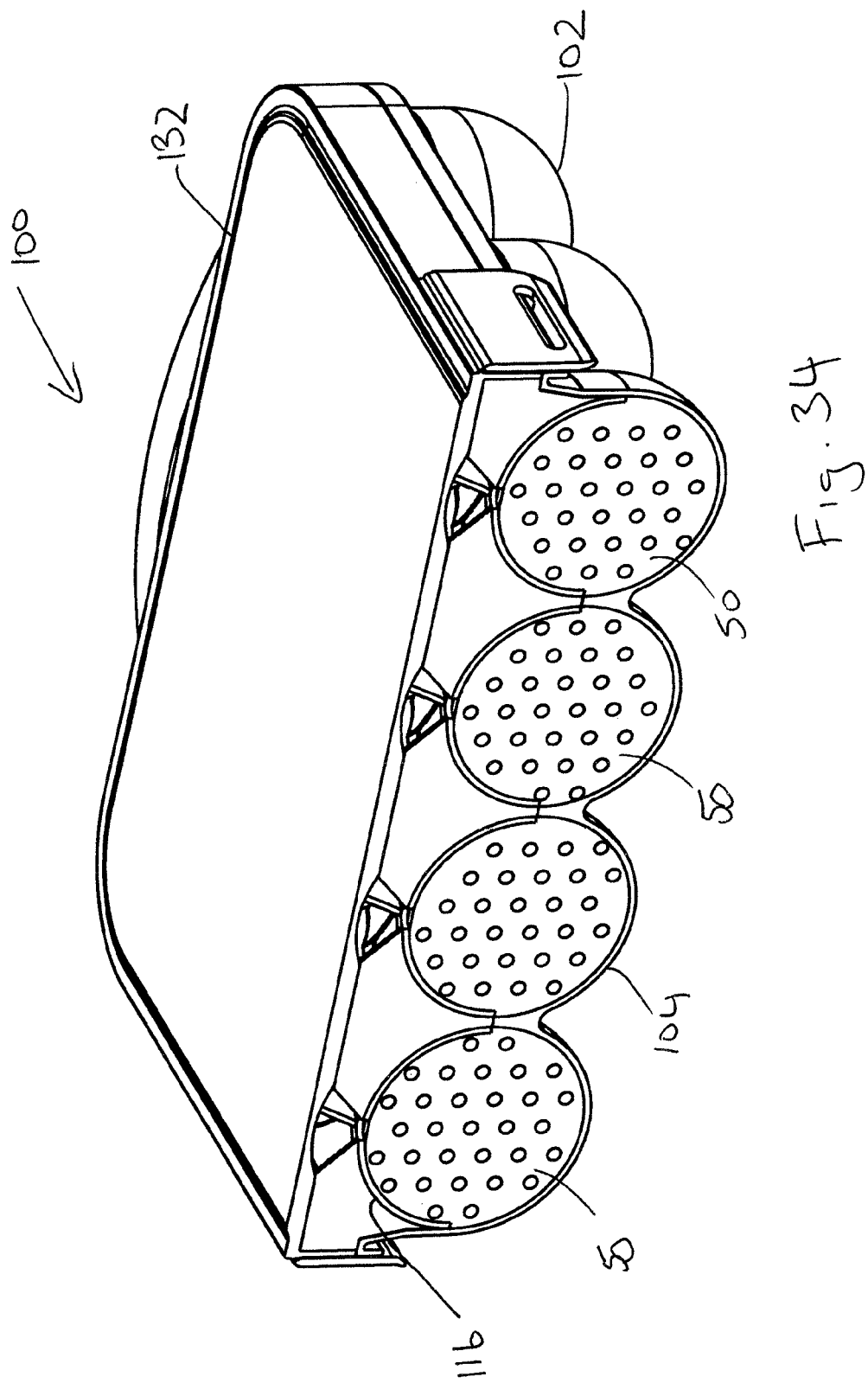

As shown in FIG. 34, the lid 132 is then optionally connected so that it extends across the mould insert 114, the apparatus 100 at this stage comprising sequentially from the bottom to the top, the container 102, the mould insert 114 and the lid 132.

Figure 35:
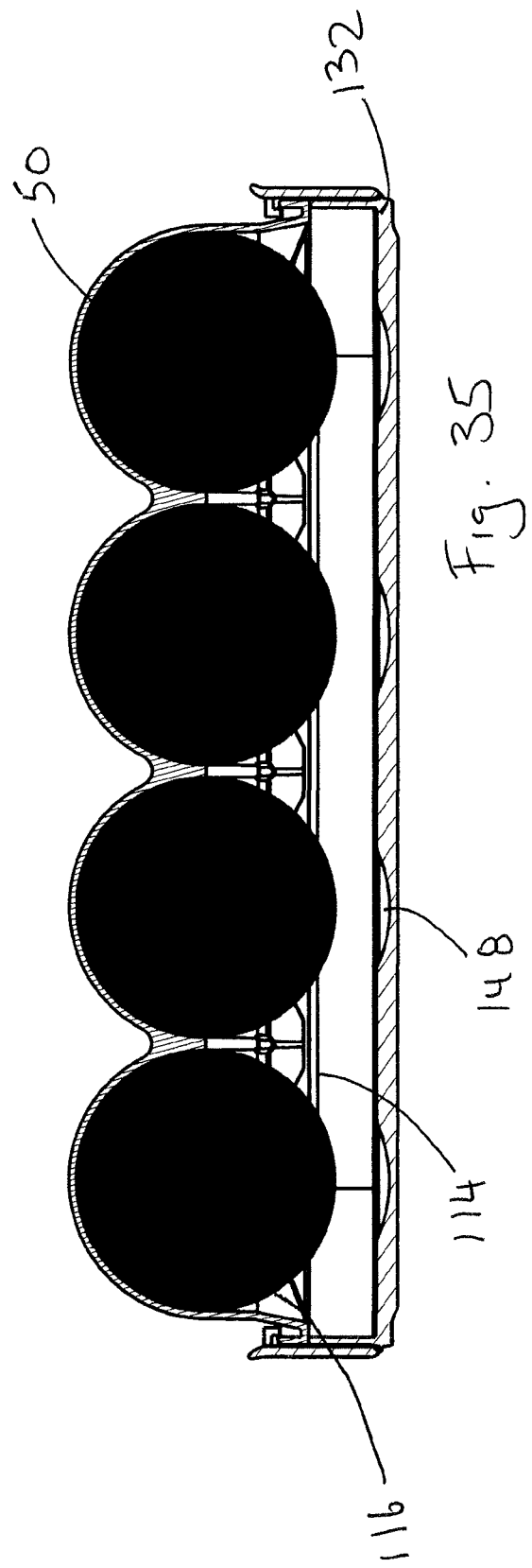

As shown in FIG. 35, the apparatus 100 is inverted so that excess food mix 50 that flows through the openings 130 between the mould chambers 116 of the framework 126 falls into the lid 132 and the lid is removed.

Figure 36:
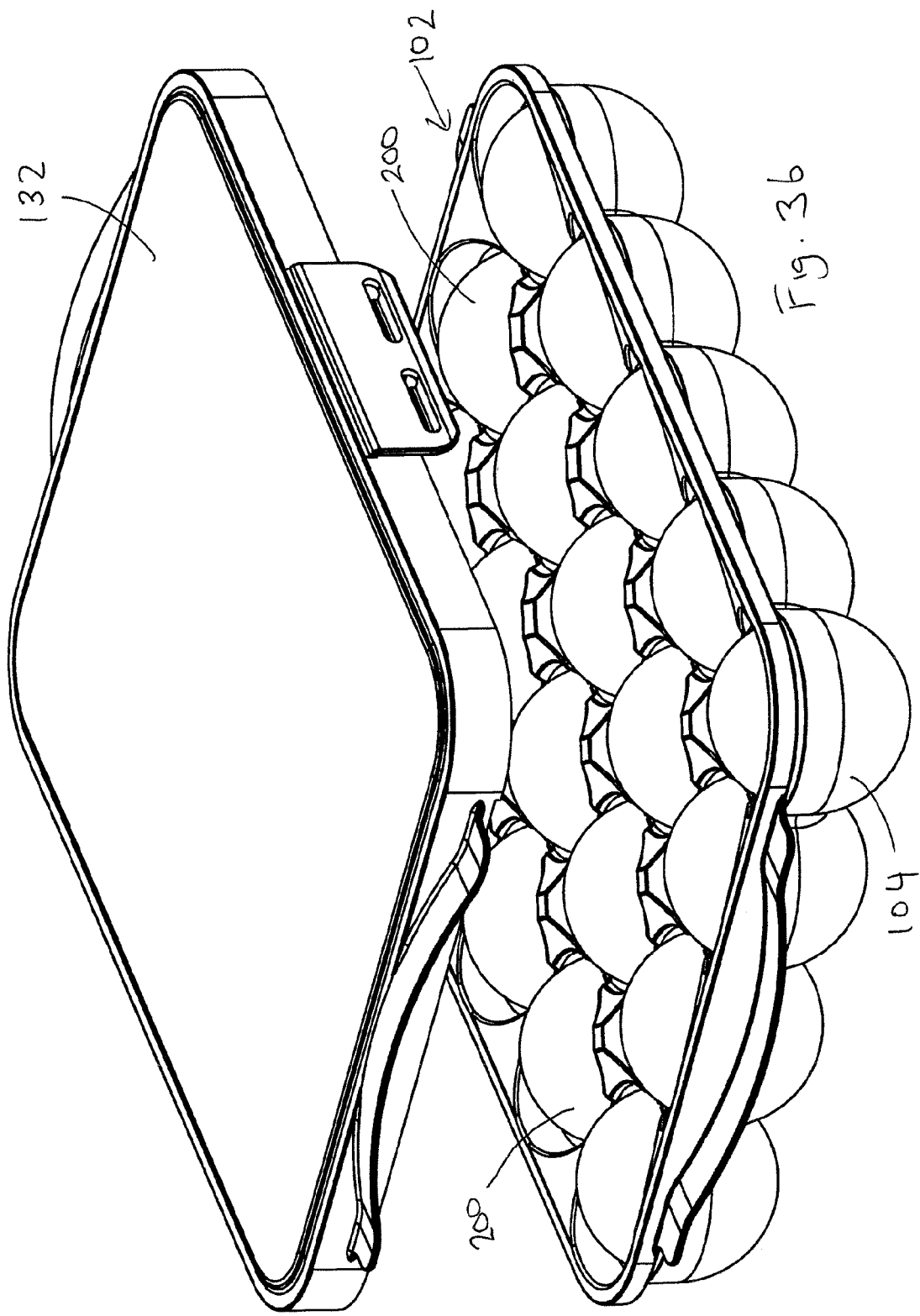
Figure 37:
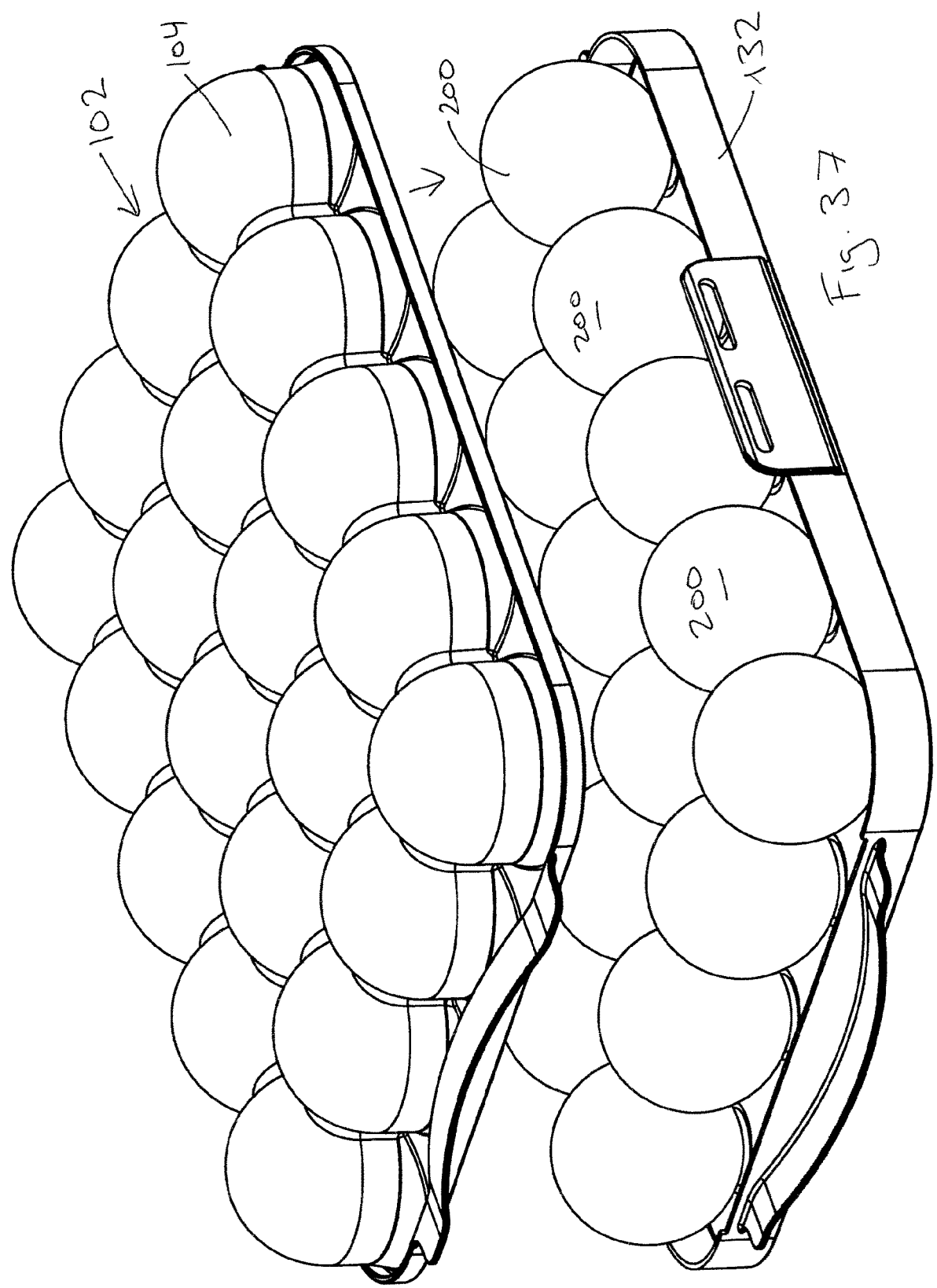

As shown in FIG. 36, the mould insert 114 is then removed from the container 102 exposing the food product 200 formed in the container chambers 104, and the lid 132 is then placed back across the opening 108 of the container 102. Finally, as shown in FIG. 37, the container 102 is inverted so that the formed food product 200 falls into the depressions 148 of the lid 132. The formed food product 200 may be stored as described above with the additional use of storage trays or cooked or eaten as required.

The present invention provides an open ended container 102 consisting of multiple interconnecting, individual, shaped container chambers 104 which are separated by vertical columns 138 and side walls 110. Where the side walls 110 of the chambers 104 join each other there is a narrow vertical slit or receiver or notch 134 at the open top end which extends downwards toward the base of the chamber 104 a calculated distance to which the chambers 116 of the mould insert 114 are designed to penetrate. The side walls 110 of the container chambers 104 are designed to hold the food mix 50 and shape the bottom section of the food product 200 while the mould chambers of the mould insert are designed to shape the upper portion of the food product 200.

The mould insert 114 comprises multiple interconnecting, individual, shaped mould chambers 116 which are sized to be inserted into the container chambers 104 of the container 102.

The outer surface 119 of the side wall 118 of each mould chamber 116 has a snug or tight fit against the inner surface 111 of the side wall 110 of each container chamber 104. The mould chambers 116 of are interconnected by a series of bridging joints which align with the vertical notches 134 provided in the side walls 110 of the of the container chambers 104 to allow the mould chambers 116 to be inserted downwards into the container chambers 104 as required to a set and defined distance.

The lid 132 may be employed both as a lid for preparing food product 200 and also as a storage tray.

During storage the mould insert 114 rests within the container 102 and the lid covers the mould insert 114. The provision of a locking means 142 formed as a holding clasp or hooked latch is operable to secure the three components of the present invention together as a unitary apparatus for storage and transportation.

The container 102 is designed to initially hold the food mix 50 prior to it being compressed into its required form and shape with the use of the mould insert 114. The individual compartments or container chambers 104 within the container 102 are separated for by vertical columns 138 and are arranged and interlinked towards the top edge of the side wall 110 to allow the food mix 50 to flow and spread freely between the container chambers 104 when the food mix 50 is being levelled. The columns 138 may be tapered at their apex 140 to assist in preventing the build up of food mix 50 on the columns 138 themselves. The vertical height of the columns 138 also provides a guide for the user when packing the food mix 50 into the container 102.

The container chambers 104 are designed to hold the required quantity of food mix 50 needed to form the desired food product 200.

When the mould insert 114 is depressed downwards into the container 102 each individual mould chamber 116 cuts and separates the levelled food mix 50 as it is being pushed through it and simultaneously compresses the food mix 50 into its desired shape by pressing it fully into the walls 110, 118 of the interior mould cavities 120 which are formed by the coupling of the container chambers 104 and the mould chambers 116.

The lid 132 may also be attached to the mould insert 114 at any time both before and after use to compress food mix 50 within the interior mould cavities 120. The function of the lid 132 is to collect any excess food mix 50 that may be held on or around the separating columns 138 and the surfaces of the apparatus exterior to the interior mould cavities 120. This may be further enhanced by a combination of inverting, shaking and tapping the fully connected apparatus 100 comprising the container 102, the mould insert 114 and the lid 132, on a solid surface with the lid 132 being the section to come in contact with the solid surface. This allows any excess food mix 50 to fall into the upturned lid 132 for collection.

The lid 132 may be removed and any excess food mix 50 gathered within it may be removed to allow the lid to be re-employed as a storage and/or a holding tray if required when the formed food product 200 is released from the container chambers 104.

Turning to FIGS. 1 to 15, which disclose a further embodiment of the invention, in which there is shown an apparatus, indicated generally by the reference numeral 1, for shaping a food product comprising a first container 2 having a base wall 23, an opening, indicated generally by the reference numeral 3, opposite the base wall 23 and a side wall 20 for receiving food mix 15. A scale, indicated generally by the reference numeral 18, is optionally provided on the side wall 20 of the first container 2 to indicate a quantity of food mix received therein.

Also shown is a second container 9 having a base wall 12, an opening, indicated generally by the reference numeral 10, opposite the base wall 12 and a side wall 13. The base wall 12 of the second container 9 may also be suitably sized such that it operable to be pressed down through the opening 3 of the first container 2 to press down and level the food mix on the base wall 23 of the first container 2. A collection lip or well 17 is also provided around a perimeter of the second container 9 to collect any waste food mix 15.

Figure 7:
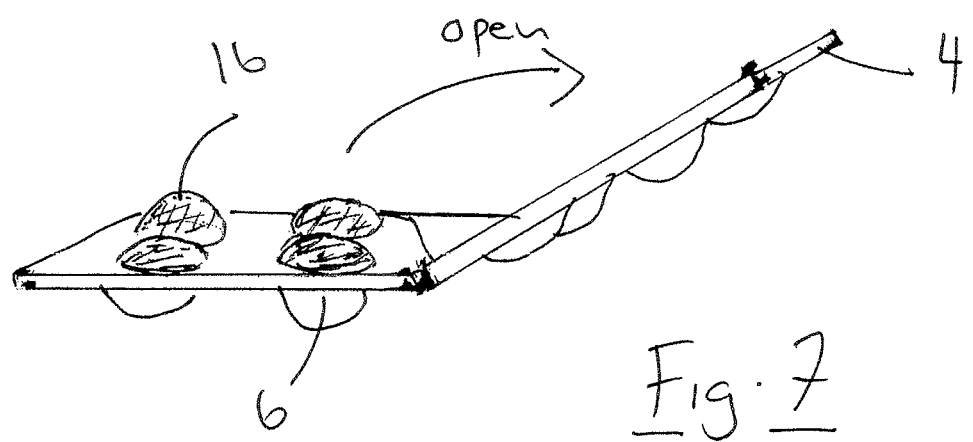
Figure 8:
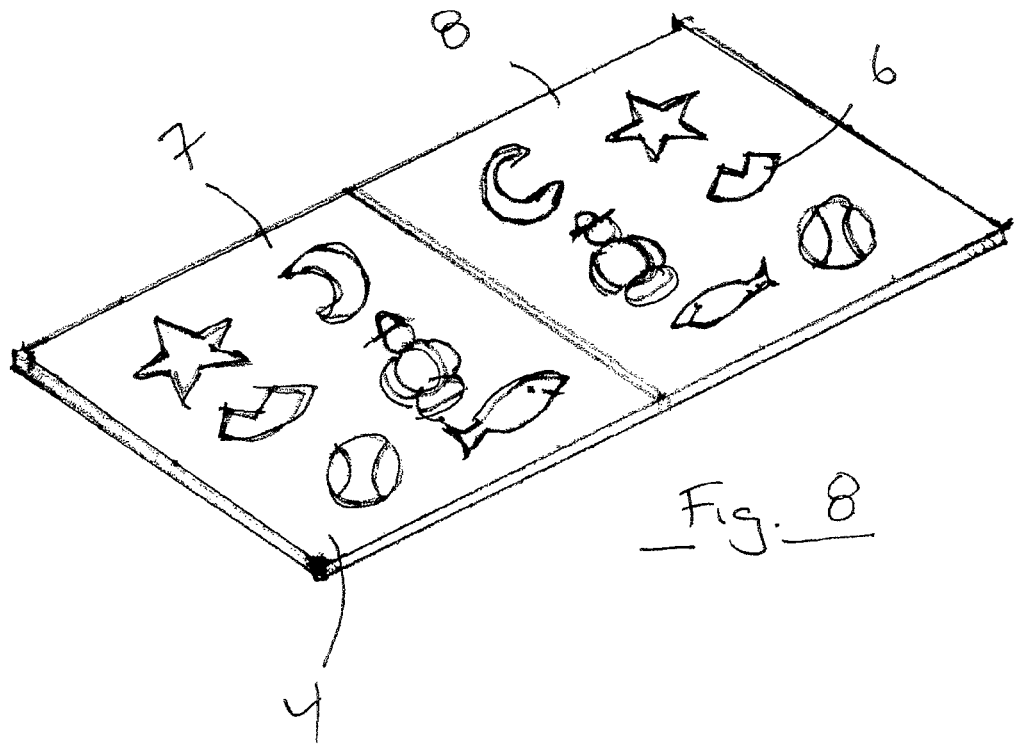
FIGS. 8 and 9 are perspective views of alternative mould inserts for use with the apparatus of FIG. 1.
Figure 9:
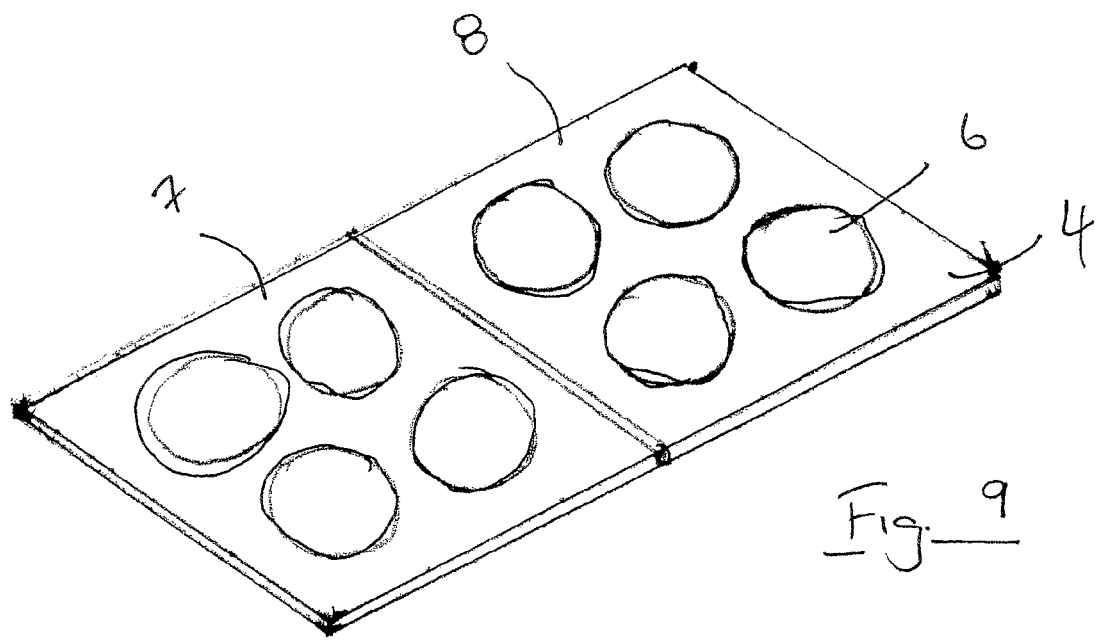

The apparatus 1 also comprises a mould insert 4 having an arrangement of receiving recesses 6 shaped according to a desired shaped for a food product. For example, and as shown in FIG. 1 and FIGS. 10 to 15, the recesses 6 in the mould 4 are shaped as hemispheres such that when the sides of the mould 4 are folded together the food product formed is substantially spherically shaped. Alternative configurations of mould inserts 4 and recesses formed therein are shown in FIGS. 7 and 8, in which the recesses 6 have different shapes. The recesses may also be a different shape in the same mould. A through hole 14 is provided in each recess 6 of the mould 4 so that excess food mix 15 may pass into the container 9 when pressing.

Also shown are open spaces 19 in the mould insert 4 through which excess food mix 15 may pass into the container 9 when pressing, which is described further below. Although shown as a lattice or grid work arrangement of interconnecting recesses portions 6 in FIG. 1, the mould insert 4 may also be formed as a tray or sheet having recesses 6 formed therein, as shown in FIGS. 2 to 8.

Figure 10:
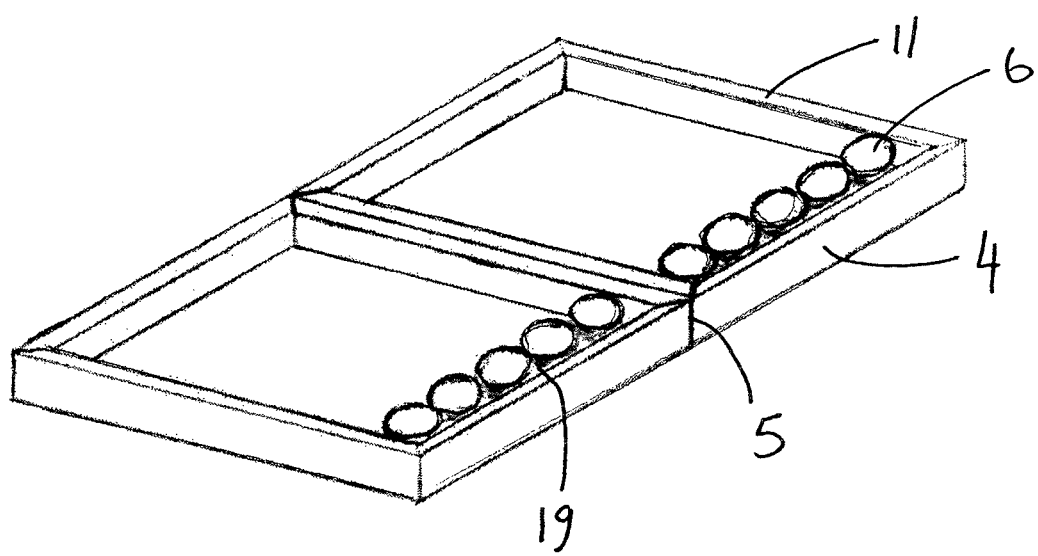
FIG. 10 is a perspective view of a mould insert of the present invention.
Figure 11:
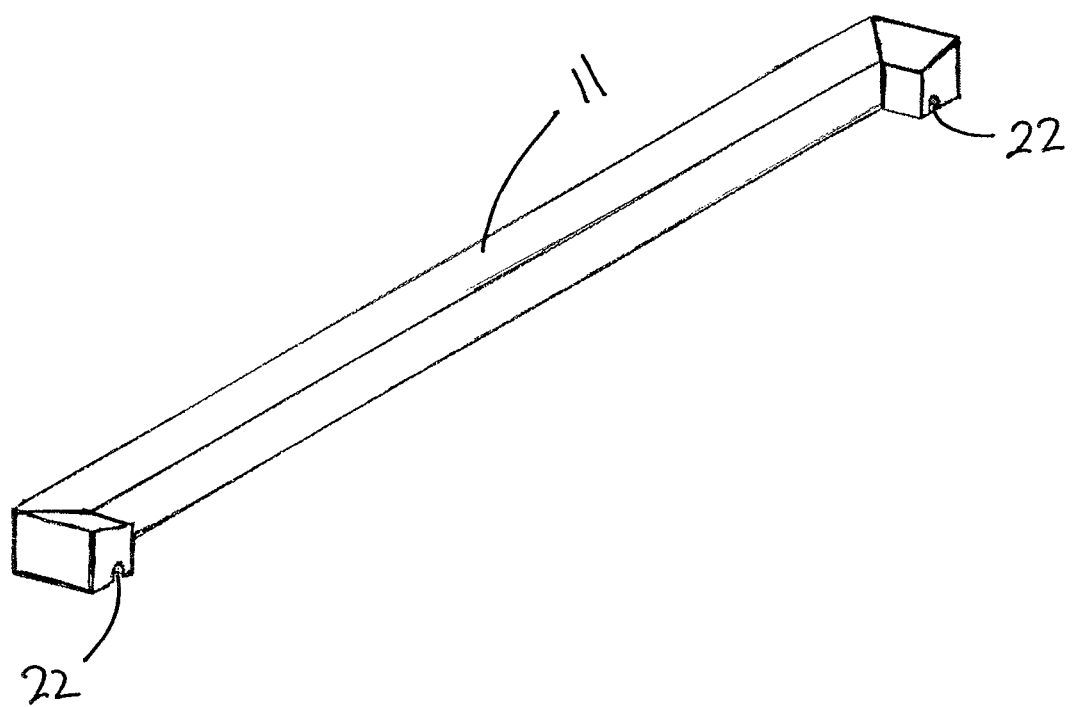
FIG. 11 is a perspective view of a rim of the mould insert shown in FIG. 10.
Figure 12:
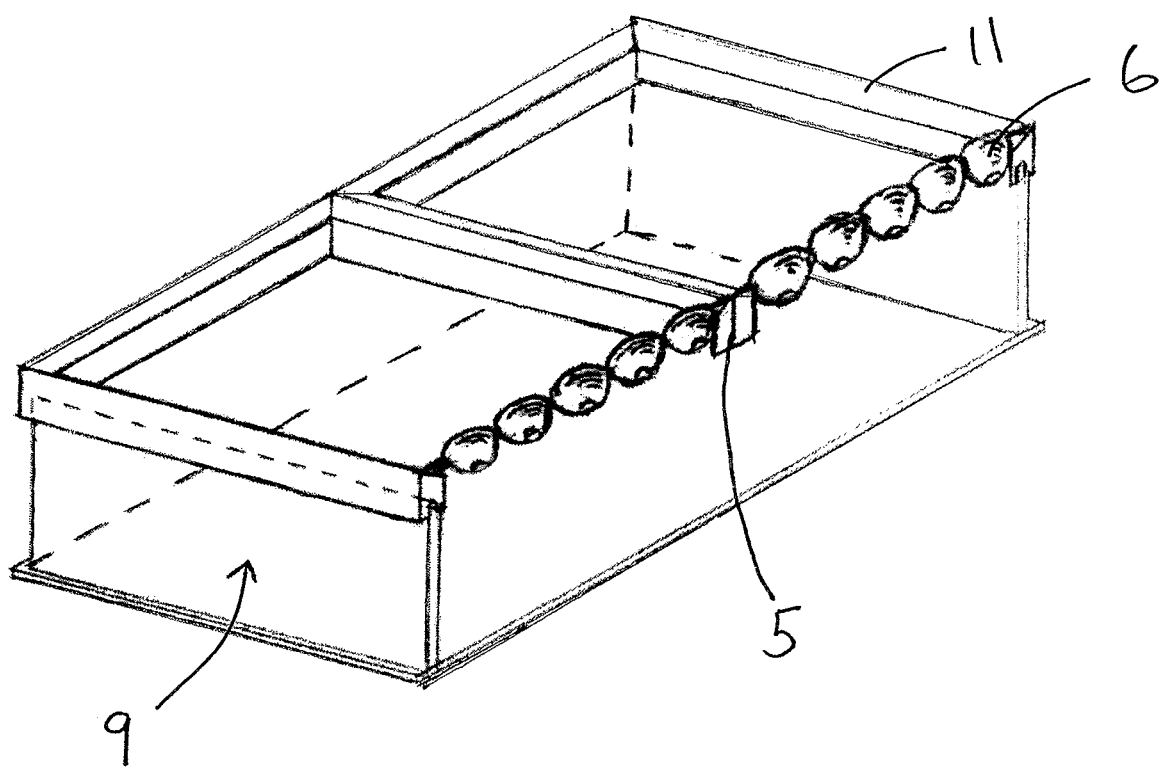
FIG. 12 is a cutaway sectional view of the mould insert shown in FIG. 10 located on a side wall of a container of the present invention.
Figure 29:
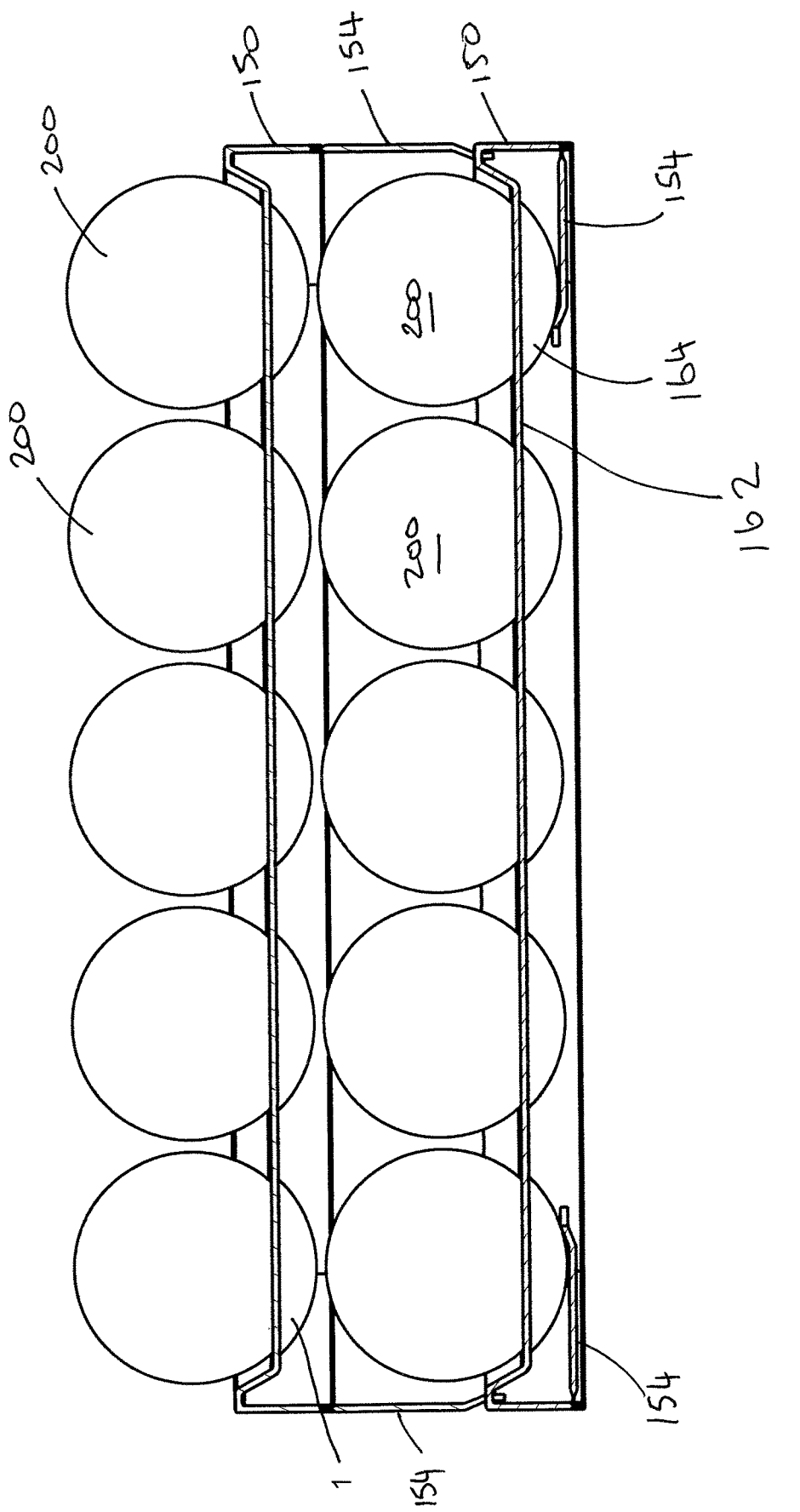

The mould insert 4 further comprises a rim 11 which is angled or tapered inwardly from the edge toward the recesses 6, as shown in FIGS. 10 and 11. Such tapered edges 11 of the mould 4 may further facilitate the venting of air through the mould 4 and tapered edge 11 may also provide a minimal point of engagement between the mould 4 and the base wall 23 of the first container 2 during pressing. A channel 22 may be provided underneath the rim to enable the mould 4 to engage with and sit on the top edge side wall 13 of the container 9, as shown in FIG. 12.

The mould insert 4 is pivoted about a hinge 5 so that the sides 7, 8 may be folded together. The hinge 5 may also be operable such that the sides 7, 8 may be decoupled or unhinged. The recesses 6 on one side 7, 8 of the mould insert 4 are a different size to the recesses 6 on the other side 7, 8 of the mould insert 4. This enables a good mating connection or complimentary fit when the recesses 6 on the opposing sides 7, 8 of the mould insert 4 are pressed together such that the recesses on one side are able to move into the recesses provided on the other side a sufficient amount to enable to food in the mating recesses to join and bind sufficiently to form a food product. The mould insert 4 is adapted such that unfolding or decoupling the sides 7, 8 causes the food product shaped between a pair of mating recesses 6 to be released.

The side wall 13 of the second container 9 provides a seat for receiving the mould insert 4. The mould insert 4 is, in use, placed on the side wall 13 so that it extends across the opening 10 of the second container 9. In the instance shown, edges 11 of the mould insert 4 rest on the side wall 13 and above the base 12 of the second container 9. The first container 2 has a perimeter that is greater than that of second container 9 so that gap is provided between the side walls of the container when they are pressed together via their openings 3, 10. Such a gap may be of any size as required or as desired, such as 3 mm, 10 mm, 20 mm etc. The actual dimension of the gap may also depend on the size of the containers 2, 9 of the present invention, and reference above to 3 mm, 10 mm or 20 mm should in no way be seen as limiting. The provision of such a gap between the sides of the containers 2, 9 will provide further means for enabling air between the containers to be vented or released, which will in turn reduce resistance caused by such air during pressing of the containers 2, 9

The containers 2, 9 are adapted so that when pressed together via their openings 3, 10 the food mix in the first container 2 is pressed into the recesses 6 in the mould insert 4, and whereby folding the sides 7, 8 of the mould insert 4 together causes food mix in recesses 6 on opposing sides 7, 8 of the mould insert 4 to combine and form a shaped food product which can be removed from the recess 6.

Figure 2:
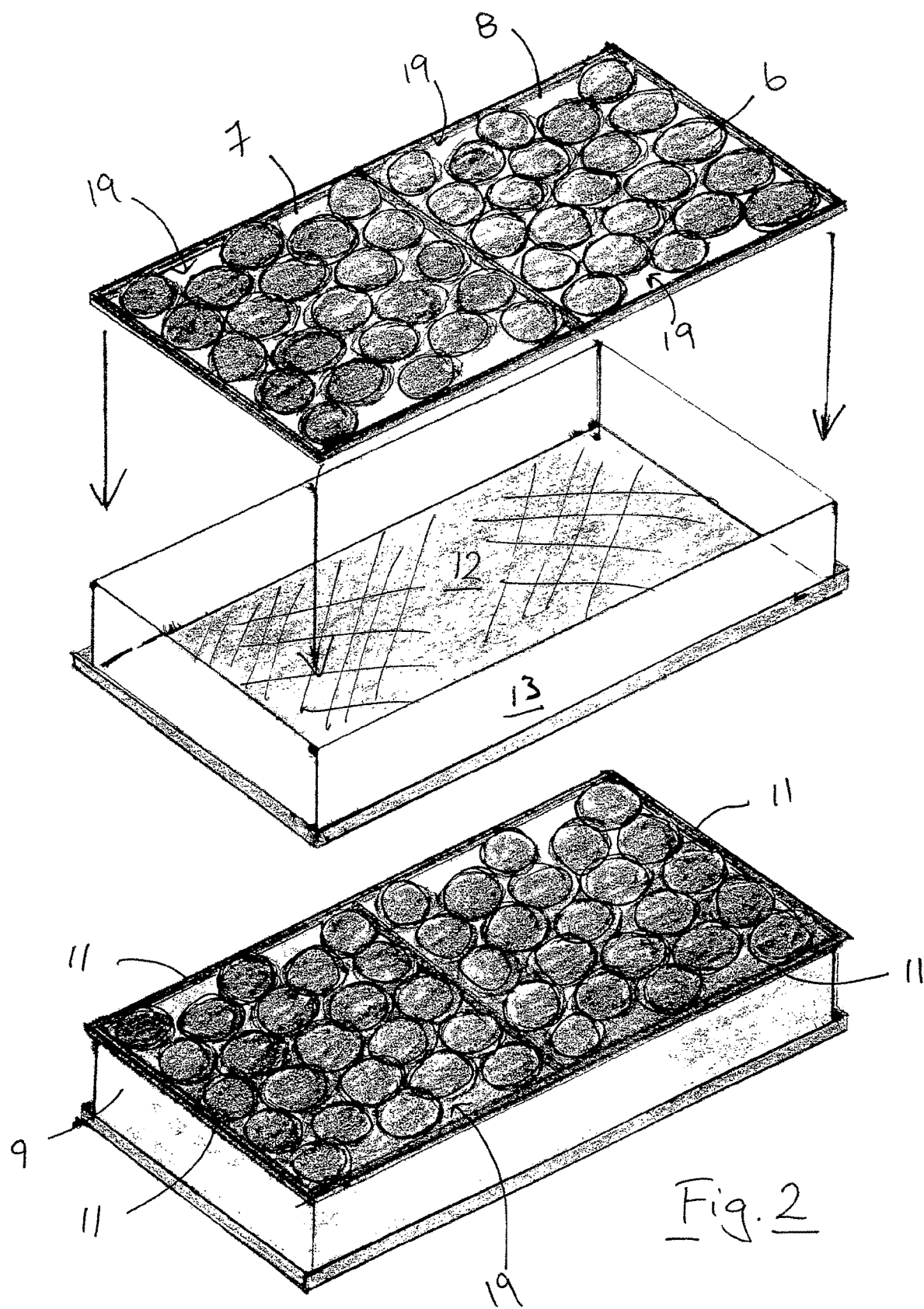
FIGS. 2 to 7 show steps in a method of shaping a food product using the apparatus of FIG. 1.
Figure 3:
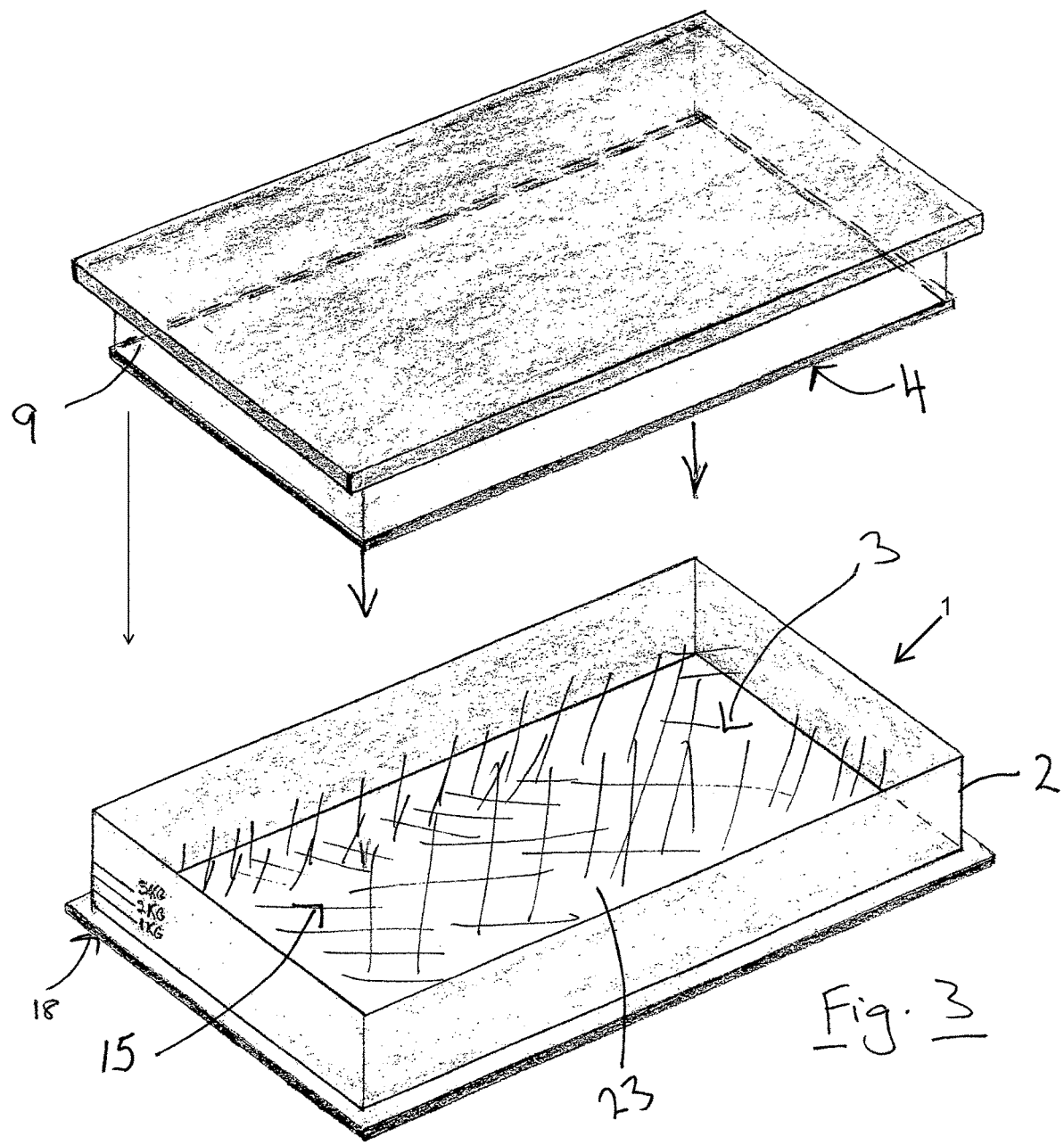

The method of shaping a food product using the above apparatus 1 comprises the initial step of placing food mix 15 through the opening 3 into the first container 2. The mould insert 4 is then placed on the second container 9, as shown in FIG. 2. The second container 9 is then inverted and pressed into the first container 2, as shown in FIG. 3. This causes the food mix 15 in the first container 2 to be pressed into the recesses 6 in the mould insert 4 in the second container 9.

Figure 4:
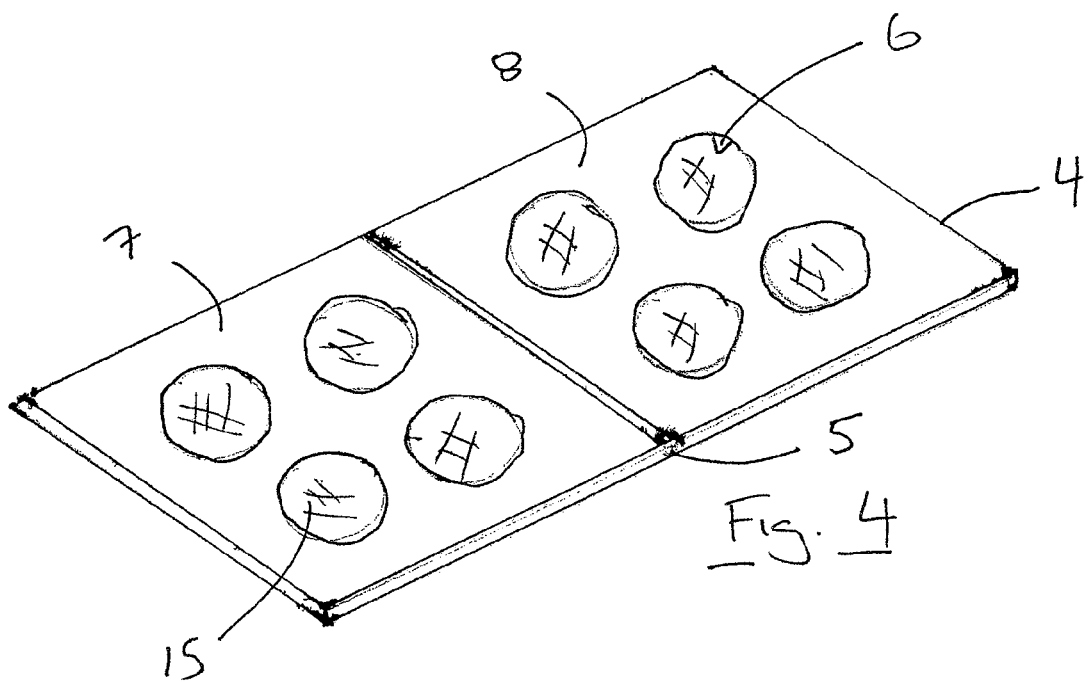

Food mix 15 not caught and pressed into a recess 6 is forced upwards through open spaces 19 in the mould insert 4 as the second container 9 is pushed into the first container 2. The gaps 19 also provide a venting function so that air in the container 2 may pass through the gaps 19 during pressing of the container 9 into the container 2. When the containers are pressed together the tapered edge 11 of the mould 4 engages against the base wall 23 of the first container 2. Optionally, a vibratory force is applied to the containers 2, 9, such as by tapping the containers 2, 9 against a work surface, so that excess food mix 15 that has passed through the holes 14 in the recesses 6, and/or the open spaces 19 in the mould insert 4, collect in the second container 9. The containers are then separated and the mould insert 4 is removed from the second container 9, as shown in FIG. 4. It will be understood that the food mix 15 is retained in the mould 4 on removal of the mould from the second container 9. The shaped food product 16 is then removed from the recess 6 of the mould 4.

Figure 5:
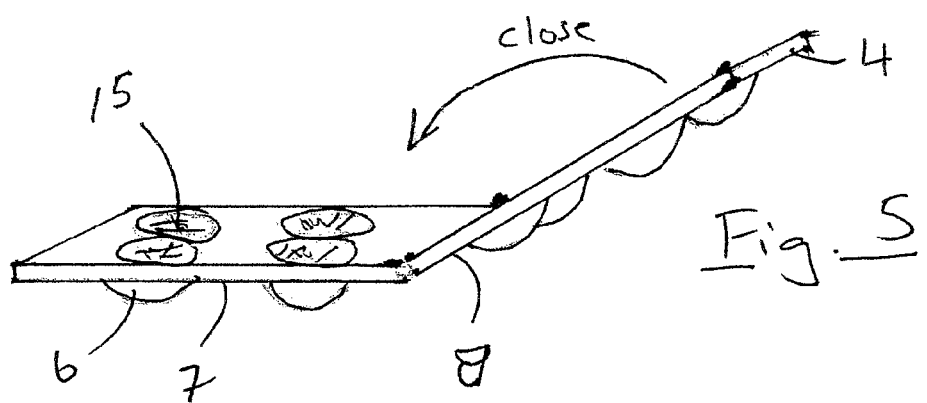
Figure 6:
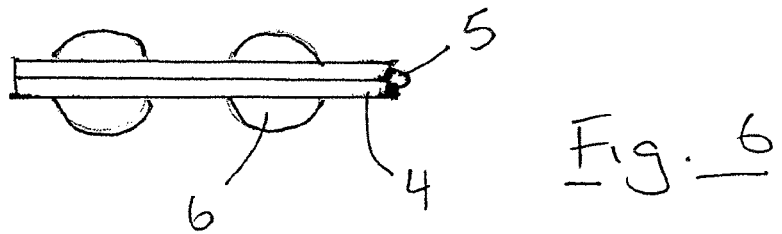

However, as a further optional step before the shaped food product 16 is removed from the recess 6 of the mould 4, and depending on the shape of the food product being formed, the sides 7, 8 of the mould insert 4 may be folded together, as shown in FIGS. 5 and 6, so that food mix in recesses 6 on opposing sides of the mould insert 7, 8 are combined to form a shaped food product. In such an optional step, the pressure of opposing recesses or cups 6 folding together causes the food mix in opposing mating recesses 6 to stick together. The sides 7, 8 of the mould insert 4 are then unfolded, as shown in FIG. 7, to provide a shaped food product 16 made of the food mix 15. Optionally, the top side 8 of the mould 4 may be unhinged or otherwise decoupled from the bottom side 7. The shaped food product 16 is then removed from the recess 6 of the mould 4.

Also provided with the apparatus 1 is a tray, optionally formed as a lid operable to cover one or other or both of the containers 2, 9 when the containers are not in use. Such a lid may be removable from the containers 2, 9 so that it may be used as a tray upon which formed food product may be stored. The lid may optionally comprise undulations or nested regions so that food product placed on the lid may be securely retained on the lid.

The present invention provides an apparatus and method for the efficient and easy formation and shaping food products around its entire outer surface so that the food product has a predetermined shape and size. The food mix 15 is at all times fully contained within and between the containers 2, 9 during shaping to avoid any spillage.

Aspects of the present invention have been described by way of example only and it should be appreciate that additions and/or modifications may be made thereto without departing from the scope thereof as defined in the appended claims.

The invention claimed is:

1. An apparatus for shaping a food product comprising:
an open container for receiving food mix, the container divided into a plurality of open container chambers in which each container chamber has a side wall forming an opening for receiving the food mix;
a mould insert comprising a plurality of mould chambers, each mould chamber having a side wall which cooperates with the side wall of one of the container chambers to define a plurality of interior mould cavities when the container and the mould insert are joined;
wherein, the side wall of each mould chamber is operable to be pushed into a respective container chamber to compress the food mix therein, and wherein each mould chamber comprises a venting aperture in the side wall of each mould chamber to provide a passage for air and excess food mix in a respective interior mould cavity to flow out of the apparatus during pressing of the mould insert into the container, and wherein the side wall of each mould chamber forms a cutting edge operable during compression to simultaneously and slidingly engage against the side wall of each container chamber to cut into and fully separate food mix contained within each respective interior mould cavity from any excess food mix remaining outside the respective interior mould cavity when the container and mould insert are joined together to thereby form and shape a food product within each interior mould cavity; and
wherein the open container further comprises upstanding columns which are interposed between adjacent container chambers, the upstanding columns having tapered apexes and extending a pre-determined vertical distance above the openings of the container chambers.

2. The apparatus of claim 1, wherein each container chamber and mould chamber cooperate when joined to form a substantially ball- or spherically shaped interior mould cavity.

3. The apparatus of claim 1, wherein the cutting edge of each mould chamber is formed by a free end of the side wall of the mould chamber and has a perimeter less than a perimeter of the opening to each container chamber.

4. The apparatus of claim 1, wherein the mould chambers are connected together by a framework comprising an arrangement of cross members.

5. The apparatus of claim 4, wherein the openings of the container chambers are provided between the mould chambers and cross members in the framework.

6. The apparatus of claim 4, wherein each container chamber comprises a plurality of receivers formed in the side wall of each container chamber, whereby the cross members of the mould insert are adapted to engage into the receivers when the container and mould insert are joined together.

7. The apparatus of claim 6, wherein each receiver is formed as a notch which extends orthogonally down from a top edge of the side wall of each container chamber a pre-determined distance into the container chamber.

8. The apparatus of claim 1, wherein the apparatus further comprises a lid connectable to one or both of the mould insert and the container.

9. The apparatus of claim 8, wherein the lid comprises seating depressions or recesses for formed food product.

10. The apparatus of claim 8, further comprising a locking mechanism to releasably lock the lid to one or both of the mould insert and the container.

11. The apparatus of claim 10, wherein the locking mechanism comprises a pivotable latch mounting a hook, whereby the hook is operable to connect under a rim of the container to secure the lid to the container.

12. The apparatus of claim 11, wherein the apparatus further comprises at least one storage tray comprising seating depressions or recesses for formed food product and a plurality receiving apertures, whereby the pivotable latches of the lid are operable to pivotably engage in the receiving apertures of the storage tray to enable the lid to be stacked a distance above the storage tray to provide a stacked arrangement for storing food product.

13. The apparatus of claim 1, wherein the apparatus further comprises a plurality of storage trays, each storage tray comprising seating depressions or recesses for formed food product, a plurality receiving apertures and pivotable supports, whereby the pivotable supports of each storage tray are operable to pivotably engage in the receiving apertures of a further storage tray to enable the storage trays to be stacked to provide a stacked arrangement for storing food product.

14. The apparatus of claim 13, wherein the storage trays are stored in a nested configuration within an area defined between a side wall of a lid and base wall of the lid of the apparatus.

* * * * *